US012223914B2

(12) United States Patent
Yeom et al.

(10) Patent No.: US 12,223,914 B2
(45) Date of Patent: Feb. 11, 2025

(54) DISPLAY DEVICE AND METHOD OF DRIVING THE SAME

(71) Applicant: SAMSUNG DISPLAY CO., LTD., Yongin-si (KR)

(72) Inventors: Seong Oh Yeom, Yongin-si (KR); Yu Chol Kim, Yongin-si (KR); Ji Hye Kim, Yongin-si (KR); Jin Wook Yang, Yongin-si (KR); Eui Myeong Cho, Yongin-si (KR); Ja Kyoung Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/206,409

(22) Filed: Jun. 6, 2023

(65) Prior Publication Data

US 2024/0169926 A1 May 23, 2024

(30) Foreign Application Priority Data

Nov. 18, 2022 (KR) ........................ 10-2022-0155576

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2310/0262* (2013.01)

(58) Field of Classification Search
CPC ............... G09G 3/3266; G09G 3/3233; G09G 2310/0262
See application file for complete search history.

(56) References Cited

U.S. PATENT DOCUMENTS

| | | | | |
|---|---|---|---|---|
| 10,102,803 | B2 | 10/2018 | Park et al. | |
| 11,263,976 | B2 | 3/2022 | Yang et al. | |
| 2018/0261163 | A1* | 9/2018 | Hyun | G09G 3/003 |
| 2018/0330655 | A1* | 11/2018 | Tsuchi | G09G 3/3275 |
| 2021/0065619 | A1* | 3/2021 | Kim | G09G 3/3233 |
| 2021/0366397 | A1* | 11/2021 | Na | G09G 3/3258 |

FOREIGN PATENT DOCUMENTS

| | | |
|---|---|---|
| KR | 1020180068368 A | 6/2018 |
| KR | 1020180115205 | 10/2018 |

* cited by examiner

*Primary Examiner* — Amit Chatly
(74) *Attorney, Agent, or Firm* — CANTOR COLBURN LLP

(57) ABSTRACT

A display device includes pixels including a light-emitting element, and an initialization transistor connected between an anode electrode of the light-emitting element and a first initialization power line to which a voltage of initialization power is supplied, and turned on when an initialization scan signal is supplied, and an initialization scan driver which supplies the initialization scan signal. The initial scan driver supplies an i-th (i is a natural number) initial scan signal to overlap an (i−1)-th initial scan signal, and supplies an (i+1)-th initial scan signal so as not to overlap the i-th initial scan signal, and the initialization scan signal is set to a gate-on voltage.

21 Claims, 25 Drawing Sheets

<DSP>

| | 11G | 23G | 35G | 51G | 87G | 127G | 151G | 203G | 255G |
|---|---|---|---|---|---|---|---|---|---|
| H-GB 1.7μs | -2.08% | -2.19% | -1.26% | -0.52% | 0.81% | 1.15% | 1.24% | 1.11% | 1.10% |
| H-GB 1.6μs | 0.45% | -1.77% | -1.19% | -0.44% | 0.85% | 1.16% | 1.18% | 1.08% | 1.14% |
| H-GB 1.5μs | 1.52% | -1.44% | -1.05% | -0.34% | 0.86% | 1.20% | 1.23% | 1.11% | 1.13% |
| H-GB 1.4μs | 2.74% | -1.24% | -0.98% | -0.37% | 0.79% | 1.22% | 1.16% | 1.08% | 1.12% |
| H-GB 1.3μs | 4.05% | -0.88% | -0.85% | -0.31% | 0.83% | 1.21% | 1.19% | 1.17% | 1.14% |
| H-GB 1.2μs | 4.69% | -0.76% | -0.82% | -0.24% | 0.87% | 1.18% | 1.20% | 1.15% | 1.12% |
| H-GB 1.1μs | 5.34% | -0.58% | -0.65% | -0.25% | 0.87% | 1.14% | 1.19% | 1.16% | 1.15% |
| H-GB 1.0μs | 6.62% | -0.26% | -0.59% | -0.25% | 0.93% | 1.22% | 1.22% | 1.12% | 1.12% |
| H-GB 0.9μs | 7.69% | -0.06% | -0.46% | -0.09% | 0.94% | 1.24% | 1.23% | 1.18% | 1.15% |
| H-GB 0.8μs | 9.40% | 0.17% | -0.37% | -0.07% | 0.99% | 1.26% | 1.20% | 1.17% | 1.16% |
| H-GB 0.7μs | 9.86% | 0.26% | -0.34% | -0.10% | 0.90% | 1.22% | 1.19% | 1.13% | 1.11% |
| H-GB 0.6μs | 11.15% | 0.54% | -0.19% | -0.10% | 0.97% | 1.20% | 1.23% | 1.18% | 1.15% |

DISPLAY DEVICE AND METHOD OF DRIVING THE SAME

This application claims priority to Korean Patent Application No. 10-2022-0155576, filed on Nov. 18, 2022, and all the benefits accruing therefrom under 35 U.S.C. § 119, the content of which in its entirety is herein incorporated by reference.

BACKGROUND

1. Field

The disclosure relates to a display device and a method of driving the same.

2. Description of the Related Art

As information technology is developed, importance of a display device, which is a connection medium between a user and information, is being highlighted. In response to this, a use of a display device such as a liquid crystal display device and an organic light-emitting display device is increasing.

Recently, a display device is desired to have a high-speed driving function that provides an image switched at a high frame frequency to a user and a low-speed driving function that provides an image switched at a low frame frequency to the user to reduce power consumption. Accordingly, a display device capable of providing an image at various frame frequencies is desired to be provided.

SUMMARY

A feature of the disclosure is to provide a display device and a method of driving the same capable of displaying an image at various frame frequencies and preventing a luminance reversal phenomenon when a frequency is changed.

In an embodiment of the disclosure, a display device includes pixels including a light-emitting element, and an initialization transistor connected between an anode electrode of the light-emitting element and a first initialization power line to which a voltage of initialization power is supplied, and turned on when an initialization scan signal is supplied, and an initialization scan driver which supplies the initialization scan signal. The initial scan driver supplies an i-th (i is a natural number) initial scan signal to overlap an (i−1)-th initial scan signal, and supplies an (i+1)-th initial scan signal so as not to overlap the i-th initial scan signal, and the initialization scan signal is set to a gate-on voltage.

In an embodiment, the initial scan driver may supply an (i+2)-th initial scan signal to overlap the (i+1)-th initial scan signal.

In an embodiment, an overlap period between the (i−1)-th initial scan signal and the i-th initial scan signal and an overlap period between the (i+1)-th initial scan signal and the (i+2)-th initial scan signal may be set to be identical to each other.

In an embodiment, a width of the initialization scan signal may be set differently according to a driving frequency.

In an embodiment, the width of the initialization scan signal may be set greater as the driving frequency is decreased.

In an embodiment, the display device may further include a timing controller which controls the initialization scan driver.

In an embodiment, each of the pixels may include a first transistor having a first electrode connected to a first power line to which first power is supplied, a second electrode connected to a third node, and a gate electrode connected to a first node, a second transistor connected between a data line and a second node, and having a gate electrode connected to a first scan line, a third transistor connected between the first node and the third node and having a gate electrode connected to a second scan line, a fourth transistor connected between the first node and the first initialization power line and having a gate electrode connected to a third scan line, a fifth transistor connected between the second node and a second initialization power line to which a voltage of reference power is supplied, and having a gate electrode connected to the second scan line, a sixth transistor connected between the third node and the anode electrode of the light-emitting element, and having a gate electrode connected to an emission control line, a first capacitor connected between the first node and the second node, and a second capacitor connected between the first power line and the second node.

In an embodiment, the anode electrode of the light-emitting element may be connected to a common terminal of the sixth transistor and the initialization transistor, and a cathode electrode of the light-emitting element is connected to a second power line to which second power is supplied.

In an embodiment, the display device may further include a first scan driver which supplies a first scan signal to the first scan line, a second scan driver which supplies a second scan signal to the second scan line, a third scan driver which supplies a third scan signal to the third scan line, an emission driver which supplies an emission control signal to the emission control line, and a data driver which supplies a data signal to the data line.

In an embodiment, one frame period may include one display scan period and one or more self-scan periods, the first scan signal, the second scan signal, the third scan signal, the initialization scan signal, and the emission control signal are supplied to the pixels during the display scan period, and the initial scan signal and the emission control signal are supplied to the pixels during the self-scan period.

In an embodiment of the disclosure, a display device includes pixels including a light-emitting element, and an initialization transistor connected between an anode electrode of the light-emitting element and an initialization power line to which a voltage of initialization power is supplied, and turned on when an initialization scan signal is supplied to an initialization scan line connected to a gate electrode, and an initialization scan driver which supplies the initialization scan signal. An initialization scan signal supplied to a predetermined initialization scan line overlaps a previous initialization scan signal and does not overlap a next initialization scan signal.

In an embodiment, a width of the initialization scan signal may be set differently according to a driving frequency.

In an embodiment, the width of the initialization scan signal may be set greater as the driving frequency is decreased.

In an embodiment of the disclosure, a display device may include pixels including a light-emitting element, and an initialization transistor connected between an anode electrode of the light-emitting element and an initialization power line to which a voltage of initialization power is supplied, and turned on when an initialization scan signal is supplied to an initialization scan line connected to a gate electrode, and an initialization scan driver which supplies the initialization scan signal. The initialization scan signal is provided in plural and initialization scan signals may be sequentially supplied, and two initialization scan signals among three successive initialization scan signals overlap.

In an embodiment of the disclosure, a method of driving a display device supplying an initialization scan signal to supply a voltage of initialization power to an anode electrode of a light-emitting element, the method includes supplying an i-th (i is a natural number) initialization scan signal to overlap an (i−1)-th initialization scan signal, and supplying an (i+1)-th initial scan signal so as not to overlap the i-th initial scan signal.

In an embodiment, the method may further include supplying an (i+2)-th initial scan signal to overlap the (i+1)-th initial scan signal.

In an embodiment, an overlap period between the (i−1)-th initial scan signal and the i-th initial scan signal and an overlap period between the (i+1)-th initial scan signal and the (i+2)-th initial scan signal may be set to be identical to each other.

In an embodiment, a width of the initialization scan signal may be set differently corresponding to a driving frequency.

In an embodiment, the width of the initialization scan signal may be set greater as the driving frequency is decreased.

In an embodiment of the disclosure, a display device includes first pixels including a first light-emitting element and a first initialization transistor connected between a first initialization power line to which a voltage of first initialization power is supplied and the first light-emitting element and turned on when an initialization scan signal is supplied, second pixels including a second light-emitting element and a second initialization transistor connected between a second initialization power line to which second initialization power is supplied and the second light-emitting element and turned on when the initialization scan signal is supplied, and an initialization scan driver which sequentially supplies the initialization scan signals. A currently supplied initialization scan signal of the initialization scan signals overlaps a previously supplied initialization scan signal of the initialization scan signals.

In an embodiment, the first initialization power line and the second initialization power line may be not electrically connected to each other.

In an embodiment, the first initialization power and the second initialization power may be set to the same voltage value.

In an embodiment, the first pixels are disposed on an odd-numbered horizontal line, and the second pixels may be disposed on an even-numbered horizontal line.

Features of the disclosure are not limited to the features described above, and other technical features which are not described will be clearly understood by those skilled in the art from the following description.

In accordance with the display device and the method of driving the same in embodiments of the disclosure, the initialization scan signal for initializing the light-emitting element may be supplied during a sufficiently long time, and thus a G-value may be satisfied.

In addition, in accordance with the display device and the method of driving the same according to the disclosure, the initialization scan signal for initializing the light-emitting element may be supplied during a sufficiently long time, thereby minimizing a luminance difference between high-speed driving and low-speed driving.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
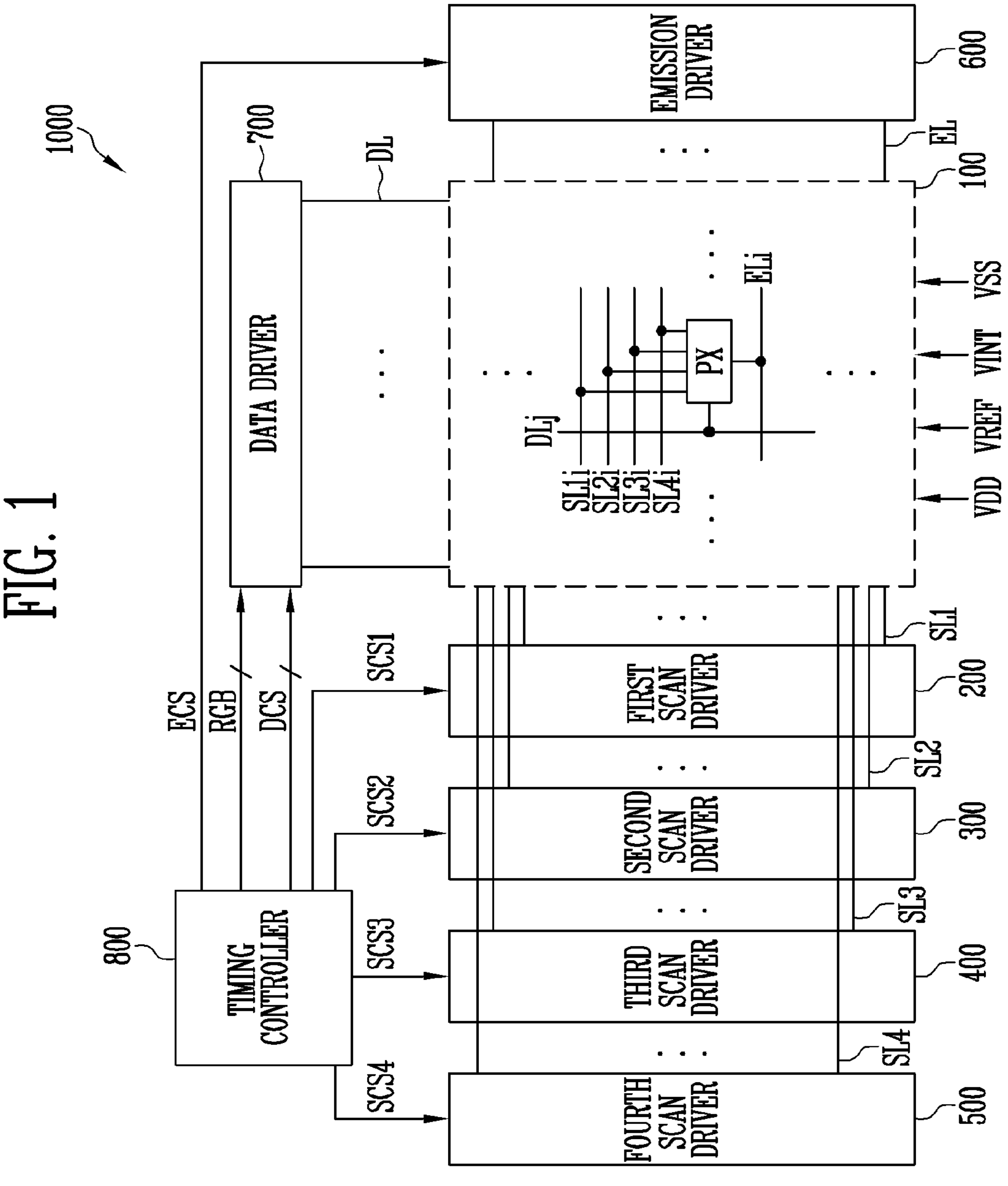
FIG. 1 is a diagram illustrating an embodiment of a display device according to the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a diagram illustrating an embodiment of a display device according to the disclosure.

Referring to FIG. 1, a display device 1000 in an embodiment of the disclosure includes a pixel unit 100, scan drivers 200, 300, 400, and 500, an emission driver 600, a data driver 700, and a timing controller 800.

In an embodiment, the display device 1000 may further include a power supply for supplying a voltage of first power VDD, a voltage of second power VSS, a voltage of initialization power VINT, and a voltage of reference power VREF to the pixel unit 100. The power supply may supply a gate-on voltage and a gate-off voltage of a scan signal and/or an emission control signal to the scan drivers 200, 300, 400, and 500 and/or the emission driver 600. However, this is merely one of embodiments, and at least one of the first power VDD, the second power VSS, the initialization power VINT, and the reference power VREF may be supplied from the data driver 700 or the timing controller 800.

According the first power VDD and the second power VSS may be used to drive a light-emitting element. To this end, the voltage of the first power VDD may be set to a level higher than that of the voltage of the second power VSS. In an embodiment, the first power VDD may be a positive voltage and the second power VSS may be a negative voltage, for example.

The initialization power VINT may be power for initializing a pixel PX. In an embodiment, a driving transistor included in the pixel PX and an anode electrode of the light-emitting element may be initialized by the voltage of the initialization power VINT, for example. The initialization power VINT may be set to a voltage lower than that of a data signal.

The reference power VREF may be power for initializing the pixel PX. In an embodiment, a capacitor and/or a transistor included in the pixel PX may be initialized by the voltage of the reference power VREF, for example. The reference power VREF may be a positive voltage. In an embodiment, the reference power VREF may have the same voltage level as the first power VDD, for example, but the disclosure is not limited thereto.

The display device 1000 may display an image at various image refresh rates (driving frequencies, or screen reproduction rates) according to a driving condition. The image refresh rate means a frequency at which the data signal is written to the driving transistor of the pixel PX. In an embodiment, the image refresh rate may be also referred to as a screen scan rate or a screen reproduction frequency, and may indicate a frequency at which a display screen is reproduced during one second, for example.

In an embodiment, an output frequency of the data driver 700 for one horizontal line (or pixel row) and/or an output frequency of the first scan driver 200 outputting a first scan signal (or write scan signal) may be determined in response to the image refresh rate. In an embodiment, a refresh rate for driving a moving image may be a frequency of about 60 hertz (Hz) or more (e.g., about 120 Hz, about 240 Hz, or the like), for example.

In an embodiment, the display device 1000 may adjust the output frequency of the scan drivers 200, 300, 400, and 500 for one horizontal line (or pixel row), and the output frequency of the data driving 700 corresponding to the output frequency of the scan drivers 200, 300, 400, and 500 according to the driving condition. In an embodiment, the display device 1000 may display an image in response to various image refresh rates of 1 Hz to 240 Hz, for example. However, this is merely one of embodiments, and the display device 1000 may display an image also at an image refresh rate of 240 Hz or higher (e.g., 480 Hz).

The pixel unit 100 includes the pixels PX respectively connected to data lines DL, scan lines SL1, SL2, SL3, and SL4, and emission control lines EL. The pixels PX may receive the first power VDD, the second power VSS, the initialization power VINT, and the reference power VREF from an outside. In an embodiment, a pixel PX disposed in an i-th (i is a natural number) row and a j-th (j is a natural number) column may be connected (or coupled) to scan lines SL1*i*, SL2*i*, SL3*i*, and SL4*i* corresponding to an i-th horizontal line, an emission control line ELI corresponding to the i-th horizontal line, and a data line DLj corresponding to a j-th vertical line (or pixel column). In an embodiment of the disclosure, the signal lines SL1, SL2, SL3, SL4, EL, and DL connected to the pixel PX may be set variously in response to a circuit structure of the pixel PX.

The scan drivers 200, 300, 400, and 500 may be divided into configurations and operations of a first scan driver 200, a second scan driver 300, a third scan driver 400, and a fourth scan driver 500. However, the division of the scan driver is for convenience of description, and at least some of the scan driver may be integrated into one driving circuit, module, or the like, according to design.

The first scan driver 200 may supply a first scan signal to first scan lines SL1 in response to a first driving control signal SCS1 supplied from the timing controller 800. In an embodiment, the first scan driver 200 may sequentially supply the first scan signal to the first scan lines SL1, for example. When the first scan signal is sequentially supplied, the pixels PX may be selected in a horizontal line unit (that is, a pixel row unit), and the data signal may be supplied to the pixels PX. That is, the first scan signal may be a signal used for writing data. The first scan signal may be set to a gate-on voltage (e.g., a relatively low level). A transistor included in the pixel PX and receiving the first scan signal is set to a turn-on state when the first scan signal is supplied.

In an embodiment, the first scan driver 200 may supply the first scan signal at a frequency equal to the refresh rate of the display device 1000 in response to any one of the first scan lines SL1 (e.g., an i-th scan line SL1*i*).

The first scan driver 200 may supply a scan signal to the first scan lines SL1 during a display scan period of one frame. In an embodiment, the first scan driver 200 may supply at least one first scan signal to each of the first scan lines SL1 during the display scan period, for example.

The second scan driver 300 may supply a second scan signal to second scan lines SL2 in response to a second driving control signal SCS2 supplied from the timing controller 800. In an embodiment, the second scan driver 300 may sequentially supply the second scan signal to the second scan lines SL2, for example. The second scan signal may be supplied to initialize the pixels PX and/or to compensate for a threshold voltage (Vth) of the driving transistor. The second scan signal may be set to a gate-on voltage (e.g., a relatively low level). A transistor included in the pixel PX and receiving the second scan signal is set to a turn-on state when the second scan signal is supplied.

The second scan driver 300 may supply the second scan signal to the second scan lines SL2 during the display scan period of one frame. In an embodiment, the second scan driver 300 may supply at least one second scan signal to each of the second scan lines SL2 during the display scan period, for example.

The third scan driver 400 may supply a third scan signal to third scan lines SL3 in response to a third driving control signal SCS3 supplied from the timing controller 800. In an embodiment, the third scan driver 400 may sequentially supply the third scan signal to the third scan lines SL3, for example. The third scan signal may be supplied to initialize the driving transistor included in the pixels PX. The third scan signal may be set to a gate-on voltage (e.g., a relatively low level). A transistor included in the pixel PX and receiving the third scan signal is set to a turn-on state when the third scan signal is supplied.

The third scan driver 400 may supply the third scan signal to the third scan lines SL3 during the display scan period of one frame. In an embodiment, the third scan driver 400 may supply at least one third scan signal to each of the third scan lines SL3 during the display scan period, for example.

The fourth scan driver 500 (or an initial scan driver) may supply a fourth scan signal to fourth scan lines SL4 (or initial scan lines) in response to a fourth driving control signal SCS4 supplied from the timing controller 800. In an embodiment, the fourth scan driver 500 may sequentially supply the fourth scan signal to the fourth scan lines SL4. The fourth scan signal may be supplied to initialize the light-emitting element included in the pixels PX, for example. The fourth scan signal may be set to a gate-on voltage (e.g., a relatively low level). A transistor included in the pixel PX and receiving the fourth scan signal is set to a turn-on state when the fourth scan signal is supplied.

In an embodiment, the fourth scan driver 500 may supply the fourth scan signal at a constant frequency regardless of the image refresh rate frequency of the display device 1000 in response to one (e.g., SL4*i*) of the fourth scan lines SL4. In an embodiment, the fourth scan driver 500 may perform scanning once (supply at least one fourth scan signal) during the display scan period, and perform scanning at least once according to the image refresh rate during the self-scan period, for example.

When the image refresh rate is decreased, the number of repetitions of an operation of the fourth scan driver 500 supplying the fourth scan signal to each of the fourth scan lines SL4 within one frame period may be increased.

The emission driver 600 may supply an emission control signal to the emission control lines EL in response to a fifth driving control signal ECS supplied from the timing controller 800. In an embodiment, the emission driver 600 may sequentially supply the emission control signal to the emission control lines EL, for example.

When the emission control signal is supplied, electrical connection between the driving transistor included and the light-emitting element in each of the pixels PX may be blocked. To this end, the emission control signal may be set to a gate-off voltage (e.g., a relatively high level) so that the transistor included in the pixels PX may be turned off. A transistor included in the pixel PX and receiving the emission control signal may be turned off when the emission control signal is supplied, and may be turned on in other cases. The emission control signal may be used to control an emission time of the pixels PX. To this end, the emission control signal may be set to a width greater than that of the scan signal.

In an embodiment, the emission driver 600 may supply the emission control signal at a constant frequency regardless of the image refresh rate frequency, similarly to the fourth scan driver 500. Therefore, within one frame period, the emission control signal supplied to the emission control lines EL may be repeatedly supplied at a predetermined period. Accordingly, when the image refresh rate is decreased, the number of repetitions of an operation of the emission driver 600 supplying the emission control signal to each of the emission control lines EL may be increased within one frame period.

The data driver 700 may receive a sixth driving control signal DCS and image data (also referred to as digital image data) RGB from the timing controller 800. The data driver 700 may supply the data signal to the data lines DL in response to the sixth driving control signal DCS. In an embodiment, the data driver 700 may generate an analog data signal using the digital image data RGB and supply the generated data signal to the data lines DL in synchronization with the first scan signal, for example.

The timing controller 800 may generate the first driving control signal SCS1, the second driving control signal SCS2, the third driving control signal SCS3, the fourth driving control signal SCS4, the fifth driving control signal ECS, and the sixth driving control signal DCS in response to synchronization signals supplied from the outside. In addition, the timing controller 800 may rearrange input image data supplied from the outside into the image data RGB and supply the rearranged image data to the data driver 700.

The first driving control signal SCS1 may include a first scan start pulse and clock signals. The first scan start pulse may control a first timing of the first scan signal output from the first scan driver 200. The clock signals may be used to shift the first scan start pulse.

The second driving control signal SCS2 may include a second scan start pulse and clock signals. The second scan start pulse may control a first timing of the second scan signal output from the second scan driver 300. The clock signals may be used to shift the second scan start pulse.

The third driving control signal SCS3 may include a third scan start pulse and clock signals. The third scan start pulse may control a first timing of the third scan signal output from the third scan driver 400. The clock signals may be used to shift the third scan start pulse.

The fourth driving control signal SCS4 may include a fourth scan start pulse and clock signals. The fourth scan start pulse may control a first timing of the fourth scan signal output from the fourth scan driver 500. The clock signals may be used to shift the fourth scan start pulse.

The fifth driving control signal ECS may include an emission start pulse and clock signals. The emission start pulse may control a first timing of the emission control signal output from the emission driver 600. The clock signals may be used to shift the emission start pulse.

The sixth driving control signal DCS may include a source start pulse and clock signals. The source start pulse may control a sampling start time point of data. The clock signals may be used to control a sampling operation.

Figure 2:
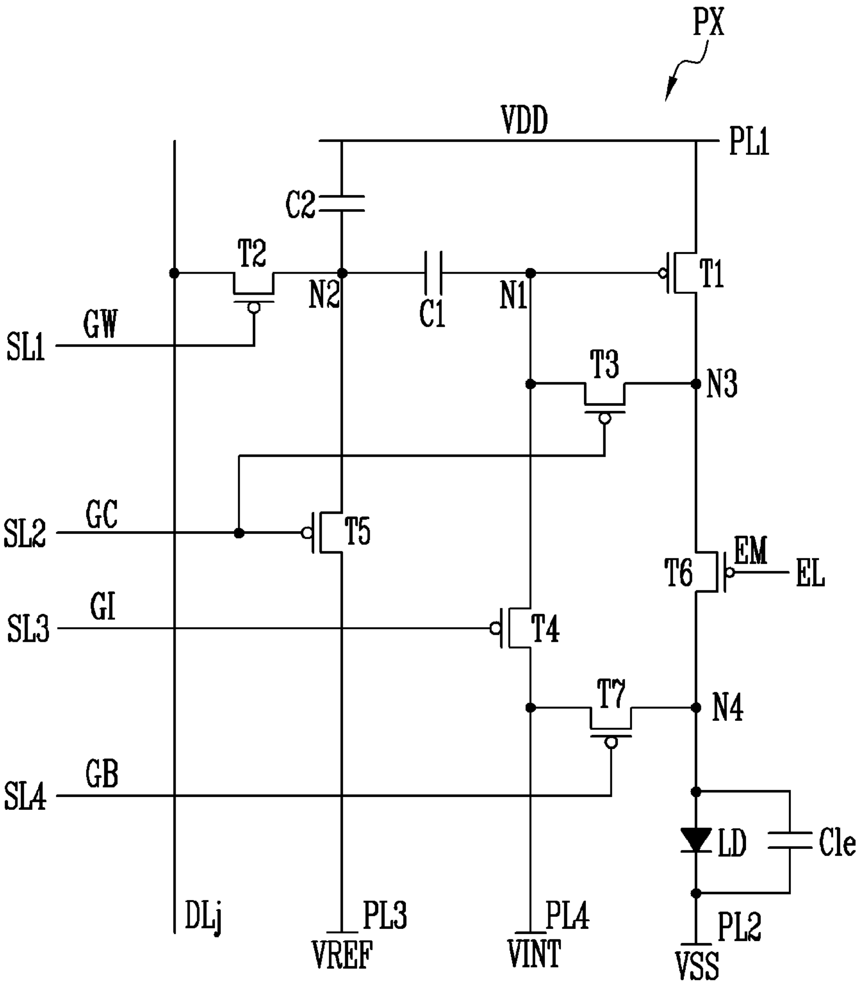
FIG. 2 is a circuit diagram illustrating an embodiment of a pixel included in the display device of FIG. 1.

FIG. 2 is a circuit diagram illustrating an embodiment of the pixel included in the display device of FIG. 1. In FIG. 2, a pixel PX disposed on an i-th horizontal line and a j-th vertical line is shown.

Referring to FIG. 2, a pixel PX in an embodiment of the disclosure may include a light-emitting element LD and a pixel circuit that controls a current amount flowing through the light-emitting element LD.

The light-emitting element LD may be connected between a first power line PL1 to which the first power VDD is supplied and a second power line PL2 to which the second power VSS is supplied. In an embodiment, a first electrode (e.g., an anode electrode) of the light-emitting element LD may be connected to the first power line PL1 via a fourth node N4 and the pixel circuit, and a second electrode (e.g., a cathode electrode) of the light-emitting element LD may be connected to the second power line PL2. The light-emitting element LD may emit light with a luminance corresponding to a driving current supplied from the pixel circuit.

The voltage of the first power VDD and the voltage of the second power VSS may have a predetermined potential difference so that the light-emitting element LD may emit light. In an embodiment, the first power VDD may be high-potential power having a higher voltage, and the second power VSS may be lower-potential power having a voltage lower than that of the first power VDD, for example.

The light-emitting element LD may be selected as an organic light-emitting diode ("OLED"). In addition, the light-emitting element LD may be selected as an inorganic light-emitting diode such as a micro light-emitting diode ("LED") or a quantum dot light-emitting diode. In addition, the light-emitting element LD may be an element configured of a combination of an organic material and an inorganic material. In FIG. 2, the pixel PX includes a single light-emitting element LD, but in another embodiment, the pixel PX may include a plurality of light-emitting elements, and the plurality of light-emitting elements may be connected to each other in series, in parallel, or in series and parallel.

The pixel circuit may include at least one transistor and at least one capacitor. In an embodiment, the pixel circuit includes a first transistor T1 (or a driving transistor), a second transistor T2, a third transistor T3, a fourth transistor T4, a fifth transistor T5, a sixth transistor T6, a seventh transistor T7, a first capacitor C1, and a second capacitor C2, for example.

The first to seventh transistors T1 to T7 are shown as P-type transistors, but the disclosure is not limited thereto. In an embodiment, at least one of the first to seventh transistors T1 to T7 may be formed as an N-type transistor, for example.

A first electrode of the first transistor T1 is connected to the first power line PL1, and a second electrode is connected to a third node N3. In addition, a gate electrode of the first transistor T1 is connected to a first node N1. The first transistor T1 may control a current amount flowing from the first power line PL1 (that is, the first power VDD) to the second power line PL2 (that is, the second power VSS) via the light-emitting element LD in response to a voltage of the first node N1. The first transistor T1 may be also referred to as a driving transistor.

A first electrode of the second transistor T2 is connected to the data line DLj, and a second electrode is connected to a second node N2. In addition, a gate electrode of the second transistor T2 is connected to the first scan line SL1. The second transistor T2 is turned on when a first scan signal GW is supplied to electrically connect the data line DLj and the second node N2. The first scan signal GW may be also referred to as a write scan signal, and the second transistor T2 may be also referred to as a switching transistor.

A first electrode of the third transistor T3 is connected to the third node N3, and a second electrode is connected to the first node N1. In addition, a gate electrode of the third transistor T3 is connected to the second scan line SL2. The third transistor T3 is turned on when a second scan signal GC is supplied to the second scan line SL2 to electrically connect the first node N1 and the third node N3. In this case, the first transistor T1 is connected in a diode form. The second scan signal GC may be also referred to as a compensation scan signal, and the third transistor T3 may be also referred to as a compensation transistor.

A first electrode of the fourth transistor T4 is connected to the first node N1, and a second electrode is connected to a fourth power line PL4 to which the initialization power VINT is supplied. In addition, a gate electrode of the fourth transistor T4 is connected to the third scan line SL3. The fourth transistor T4 is turned on when a third scan signal GI is supplied to the third scan line SL3 to supply the voltage of the initialization power VINT to the first node N1. Here, the third scan signal GI may be also referred to as a second initialization scan signal, the fourth transistor T4 may be also referred to as a second initialization transistor, and the fourth power line PL4 may be also referred to as a first initialization power line.

A first electrode of the fifth transistor T5 is connected to the second node N2, and a second electrode is connected to the third power line PL3. In addition, a gate electrode of the fifth transistor T5 is connected to the second scan line SL2. The fifth transistor T5 is turned on when the second scan signal GC is supplied to the second scan line SL2 to supply the voltage of the reference voltage VREF to the second node N2. Here, the reference power VREF may be set to the same voltage as the first power VDD or a predetermined direct current ("DC") voltage. The fifth transistor T5 may be also referred to as a third initialization transistor, and the third power line PL3 may be also referred to as a second initialization power line.

A first electrode of the sixth transistor T6 is connected to the third node N3, and a second electrode is connected to the fourth node N4 (that is, the anode electrode of the light-emitting element LD). In addition, a gate electrode of the sixth transistor T6 is connected to the emission control line EL. The sixth transistor T6 is turned off when the emission control signal EM having an inactive level (e.g., high level) is supplied to the emission control line EL, and turned on in other cases. When the sixth transistor T6 is turned off, the first transistor T1 and the light-emitting element LD are electrically cut off, and thus the light-emitting element LD may be set to a non-emission state. The sixth transistor T6 may be also referred to as an emission transistor.

A first electrode of the seventh transistor T7 is connected to the fourth node N4, and a second electrode is connected to the fourth power line PL4. In addition, a gate electrode of the seventh transistor T7 is connected to the fourth scan line SL4. The seventh transistor T7 is turned on when a fourth scan signal GB is supplied to the fourth scan line SL4 to supply the voltage of the initialization power VINT to the anode electrode of the light-emitting element LD. When the voltage of the initialization power VINT is supplied to the anode electrode of the light-emitting element LD, a voltage of an organic capacitor Cle formed in the light-emitting element LD may be discharged. When the voltage charged in the organic capacitor Cle is discharged, black expression capability may be improved. The fourth scan signal GB may be also referred to as a first initialization scan signal (or an initialization scan signal), and the seventh transistor T7 may be also referred to as a first initialization transistor (or an initialization transistor).

The first capacitor C1 is connected between the first node N1 and the second node N2. The first capacitor C1 may store a voltage between the first node N1 and the second node N2.

The second capacitor C2 is connected between the first power line PL1 and the second node N2. The second capacitor C2 may store a voltage of the second node N2 and may stabilize the voltage of the second node N2.

Figure 3:
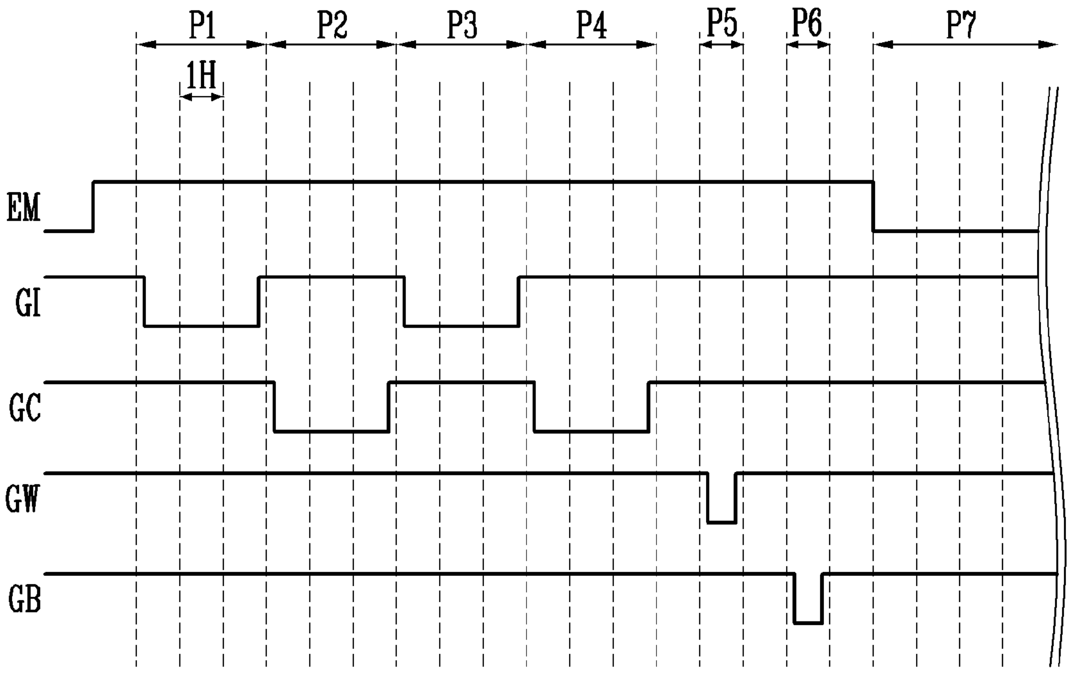
FIG. 3 is a waveform diagram illustrating a method of driving the pixel of FIG. 2 during a display scan period.

FIG. 3 is a waveform diagram illustrating a method of driving the pixel of FIG. 2 during the display scan period.

Referring to FIG. 3, the display scan period DSP may include a first period P1 to a fourth period P4. The first period P1 to the fourth period P4 may be a threshold voltage compensation period of the first transistor T1.

The display scan period DSP may include a fifth period P5 and a sixth period P6. The fifth period P5 may be a data writing period, and the sixth period P6 may be an initialization period of the light-emitting element LD.

The display scan period DSP may include a seventh period P7. The seventh period P7 may be an emission period.

An interval between dotted lines in FIG. 3 may be set to one horizontal period (1H). One horizontal period (1H) may refer to a time interval of sequentially supplied scan signals or may be a time allocated to apply a data signal to one horizontal line. In an embodiment, when the display device 1000 reproduces an image at a frequency of 240 Hz, one horizontal period (1H) may be approximately 1.84 microseconds (μs) or less, for example.

The first period P1 to the fourth period P4 are shown as having a length of three horizontal periods (3H), but may have a value greater than or less than three horizontal periods (3H) according to a driving method. In addition, a length of at least one of the first period P1 to the fourth period P4 may be different from that of other periods.

Figure 4:
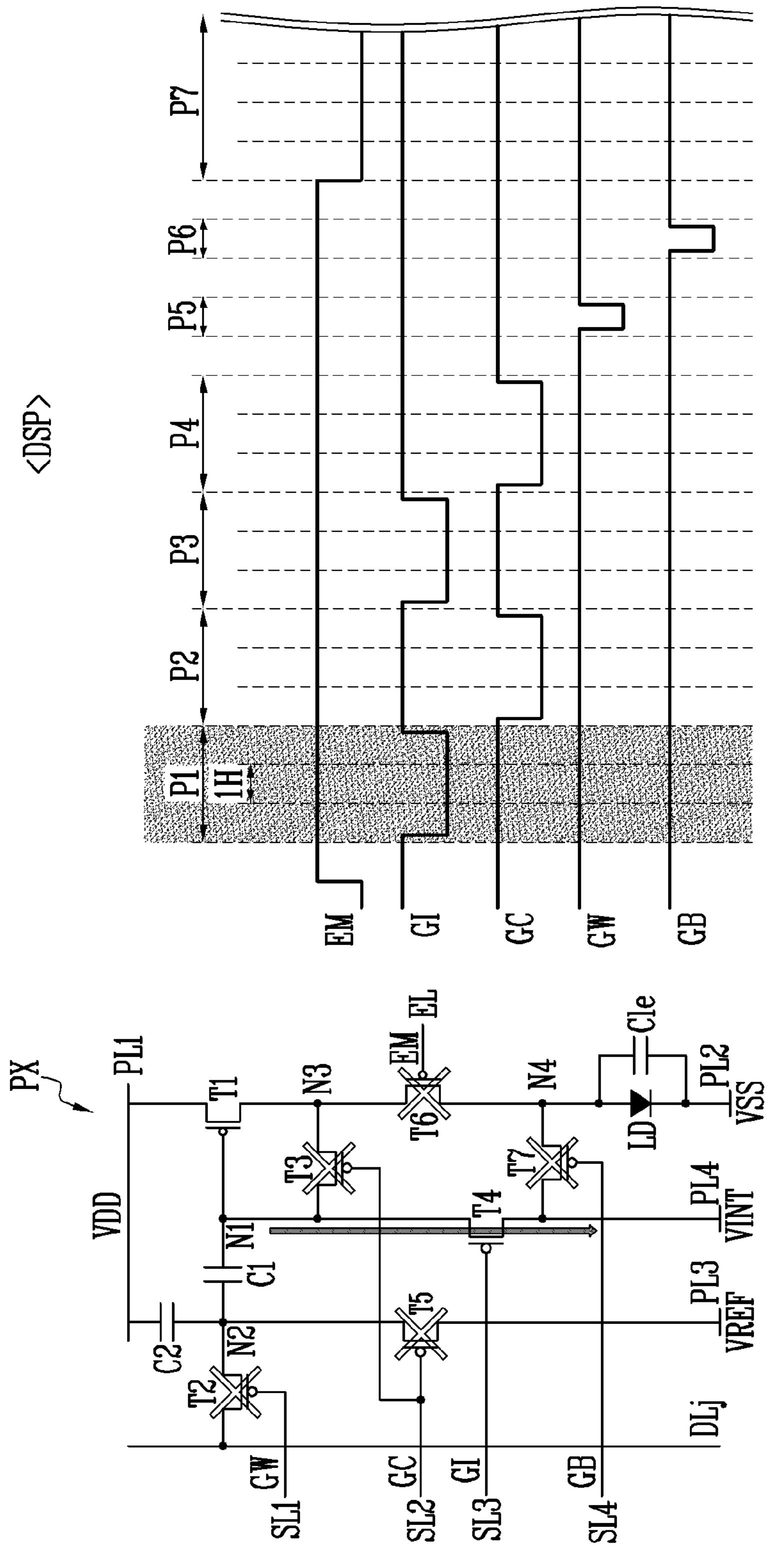
FIG. 4 is a diagram illustrating a first period of FIG. 3 together with the pixel of FIG. 2.

FIG. 4 is a diagram illustrating the first period of FIG. 3 together with the pixel of FIG. 2.

Referring to FIG. 4, the emission control signal EM having the inactive level (e.g., high level) is supplied to the emission control line EL during the first period P1 to the sixth period P6. When the emission control signal EM having the inactive level (e.g., high level) is supplied to the emission control line EL, the sixth transistor T6 is turned off. When the sixth transistor T6 is turned off, electrical connection between the first transistor T1 and the light-emitting element LD is blocked, and thus the light-emitting element LD is set to the non-emission state.

In the first period P1, the third scan signal GI is supplied to the third scan line SL3. When the third scan signal GI is supplied to the third scan line SL3, the fourth transistor T4 is turned on. When the fourth transistor T4 is turned on, the voltage of the initialization power VINT is supplied to the first node N1, and a voltage of a data signal of a previous frame may be decreased.

Figure 5:
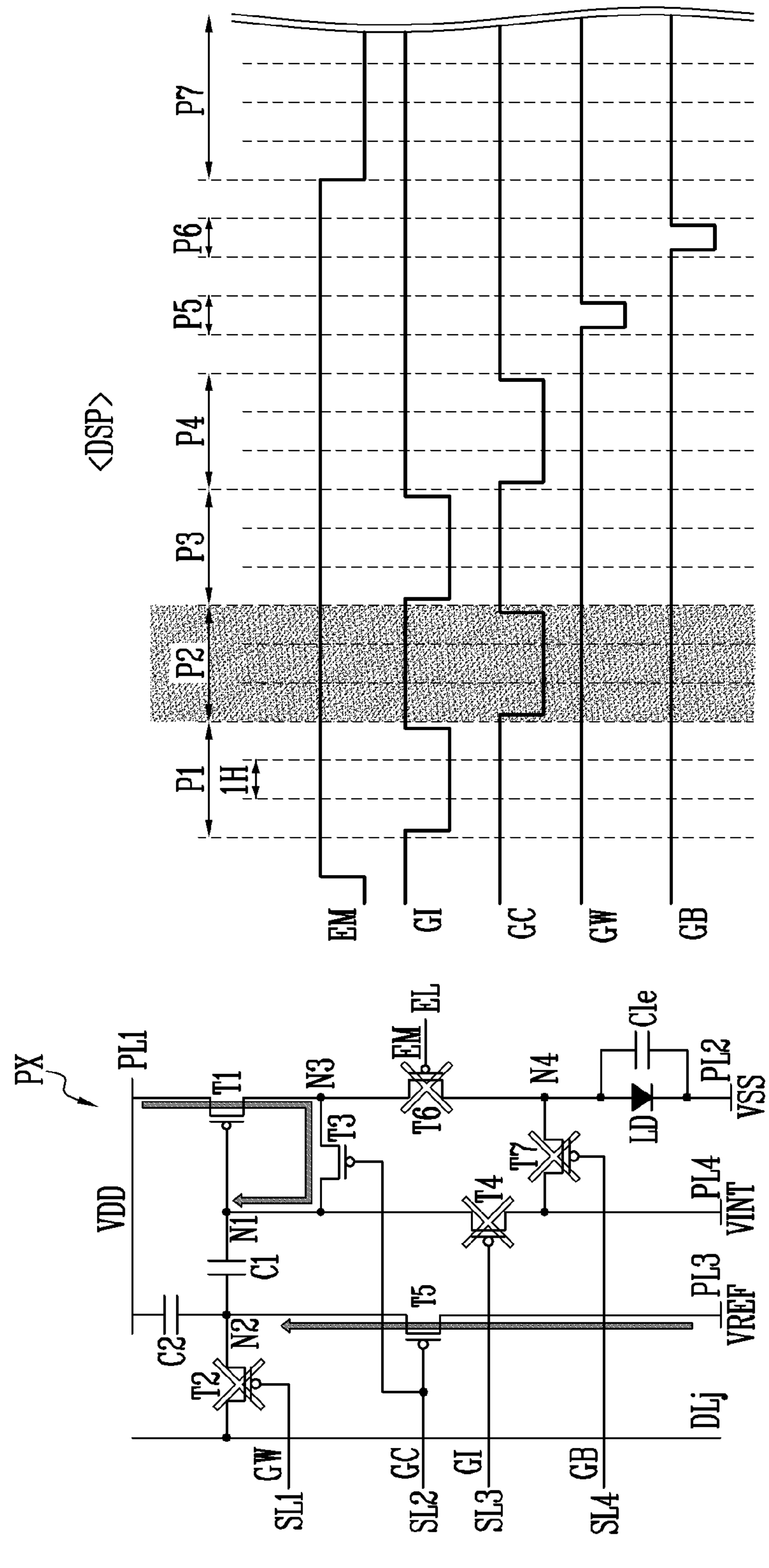
FIG. 5 is a diagram illustrating a second period of FIG. 3 together with the pixel of FIG. 2.

FIG. 5 is a diagram illustrating the second period of FIG. 3 together with the pixel of FIG. 2.

Referring to FIG. 5, in the second period P2, the second scan signal GC is supplied to the second scan line SL2. When the second scan signal GC is supplied to the second scan line SL2, the third transistor T3 and the fifth transistor T5 are turned on.

When the third transistor T3 is turned on, the first transistor T1 is connected in a diode form. Then, a voltage corresponding to a difference between the first power VDD and the threshold voltage of the first transistor T1 may be applied to the first node N1.

When the fifth transistor T5 is turned on, the voltage of the reference power VREF is supplied to the second node N2. Then, a voltage of the second node N2 is changed from a voltage of the previous frame to approximately the voltage of the reference power VREF.

During the second period P2, the first capacitor C1 may store a voltage corresponding to a difference between the first node N1 and the second node N2. Here, since the first power VDD and the reference power VREF are set to a fixed voltage, a voltage corresponding to the threshold voltage of the first transistor T1 may be stored in the first capacitor C1.

Figure 6:
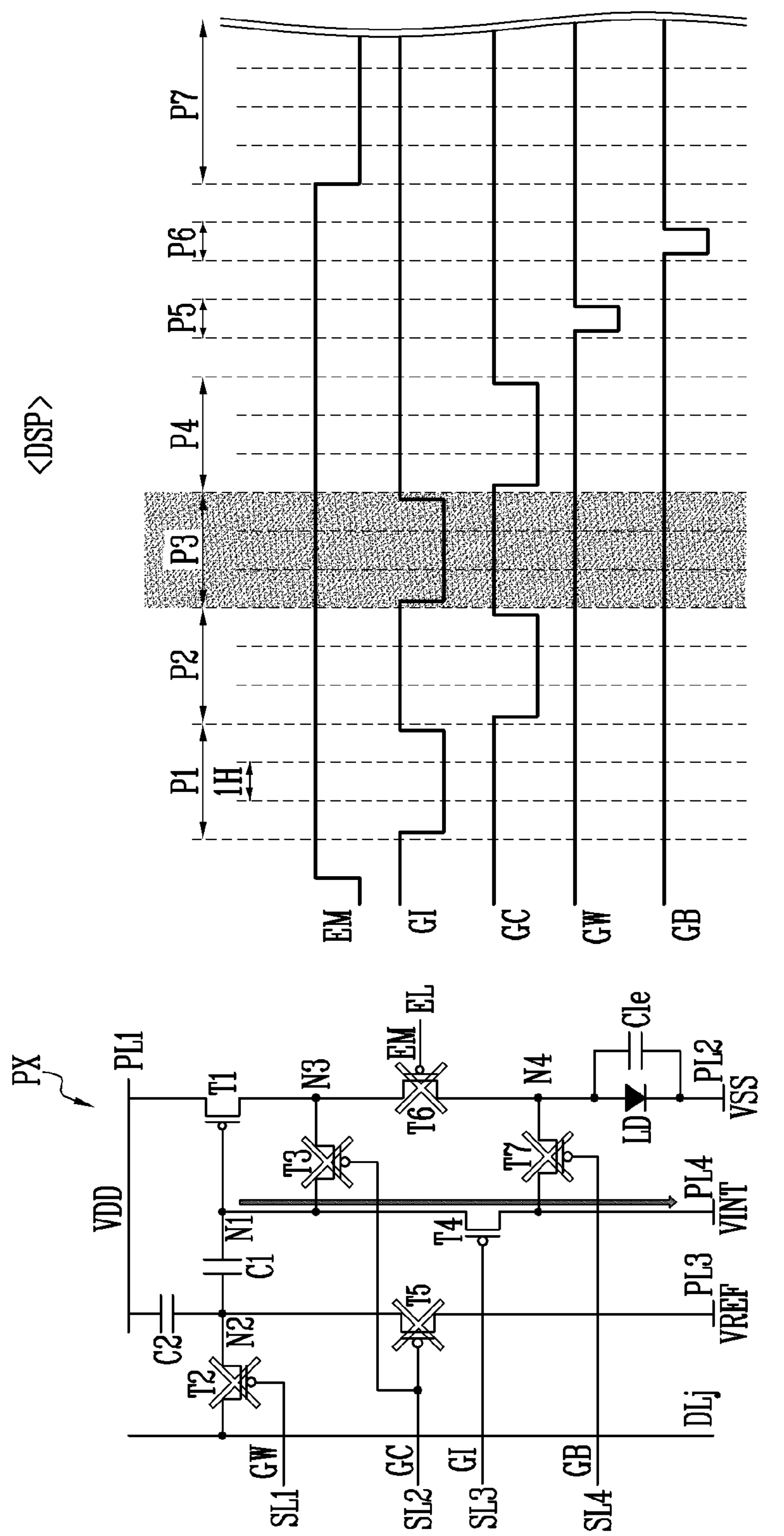
FIG. 6 is a diagram illustrating a third period of FIG. 3 together with the pixel of FIG. 2.

FIG. 6 is a diagram illustrating the third period of FIG. 3 together with the pixel of FIG. 2. In the third period P3, the pixel PX may be driven in a method identical or similar to that of the first period P1 described above.

Referring to FIG. 6, in the third period P3, the third scan signal GI is supplied to the third scan line SL3. When the third scan signal GI is supplied to the third scan line SL3, the fourth transistor T4 is turned on. When the fourth transistor T4 is turned on, the voltage of the initialization power VINT is supplied to the first node N1. At this time, during the third period P3, the voltage of the first node N1 may be determined regardless of the voltage applied in the previous frame.

Figure 7:
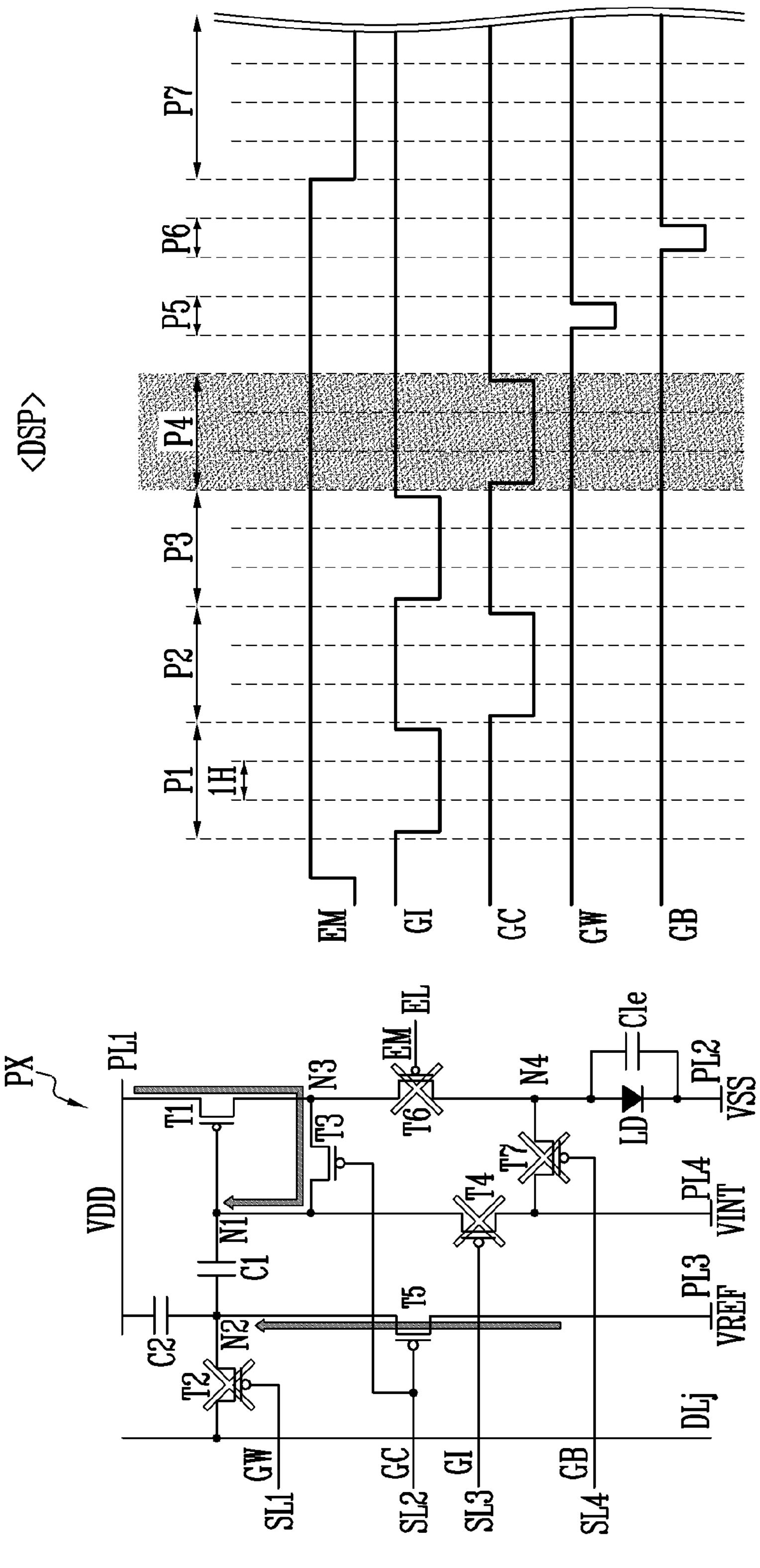
FIG. 7 is a diagram illustrating a fourth period of FIG. 3 together with the pixel of FIG. 2.

FIG. 7 is a diagram illustrating the fourth period of FIG. 3 together with the pixel of FIG. 2. In the fourth period P4, the pixel PX may be driven in a method identical or similar to that of the method of the second period P2 described above.

Referring to FIG. 7, in the fourth period P4, the second scan signal GC is supplied to the second scan line SL2. When the second scan signal GC is supplied to the second scan line SL2, the third transistor T3 and the fifth transistor T5 are turned on.

When the third transistor T3 is turned on, the first transistor T1 is connected in a diode form. Then, the voltage corresponding to the difference between the first power VDD and the threshold voltage of the first transistor T1 may be applied to the first node N1.

When the fifth transistor T5 is turned on, the voltage of the reference power VREF is supplied to the second node N2. Then, the voltage of the second node N2 is changed to approximately the voltage of the reference power VREF. During the fourth period P4, the voltage corresponding to the threshold voltage of the first transistor T1 may be stored in the first capacitor C1.

In an embodiment of the disclosure, the threshold voltage of the first transistor T1 may be more accurately compensated through the first period P1 to the fourth period P4.

In FIG. 3, the first period P1 to the fourth period P4 are included in order to compensate for the threshold voltage, but the disclosure is not limited thereto. In an embodiment, a plurality of additional periods may be further included in addition to the first period P1 to the fourth period P4 to compensate for the threshold voltage, for example.

Figure 8:
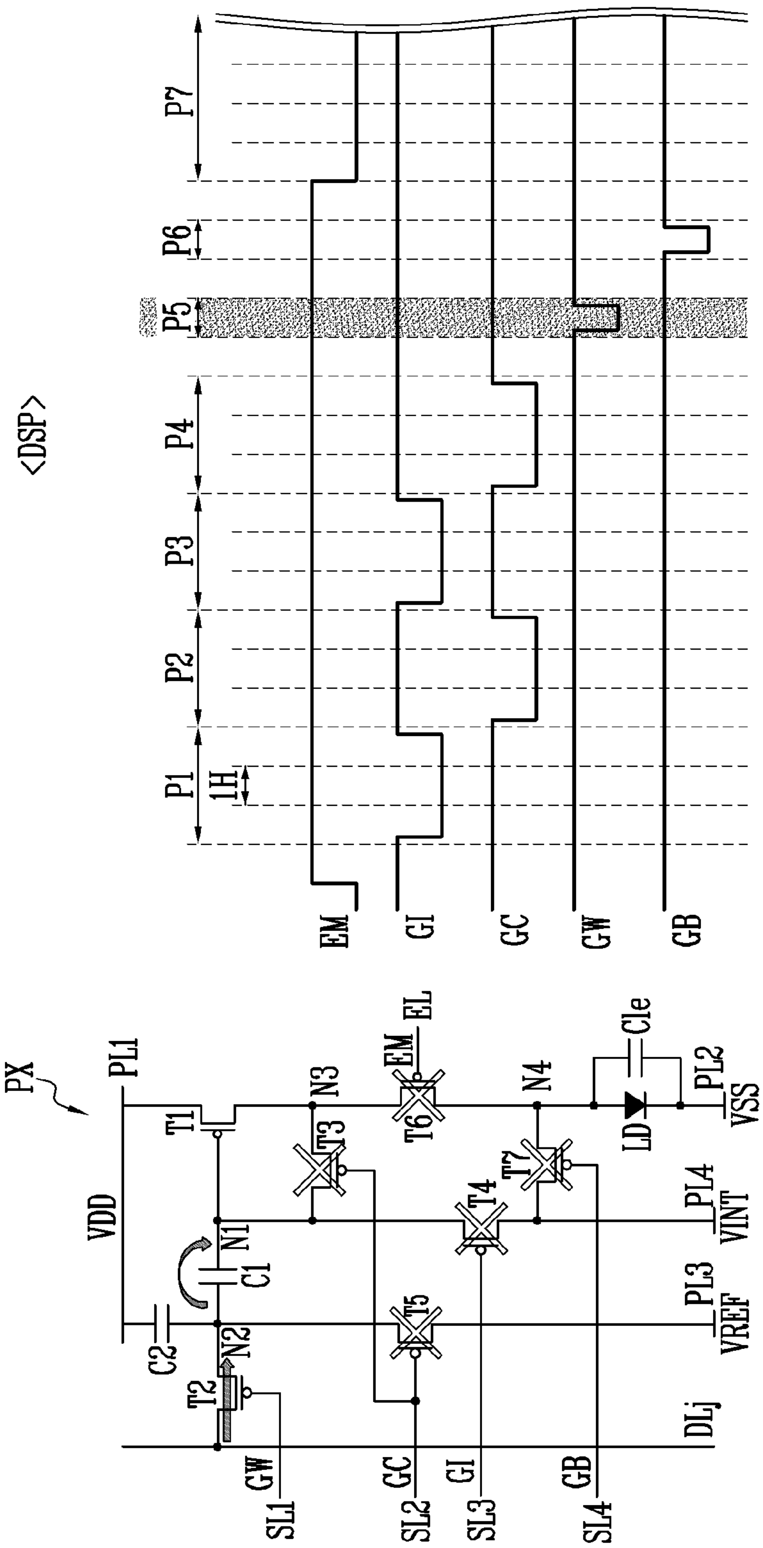
FIG. 8 is a diagram illustrating a fifth period of FIG. 3 together with the pixel of FIG. 2.

FIG. 8 is a diagram illustrating the fifth period of FIG. 3 together with the pixel of FIG. 2.

Referring to FIG. 8, in the fifth period P5, the first scan signal GW is supplied to the first scan line SL1. When the first scan signal GW is supplied to the first scan line SL1, the second transistor T2 is turned on. When the second transistor T2 is turned on, the data signal from the data line DLj is supplied to the second node N2. When the data signal is supplied to the second node N2, the voltage of the second node N2 is changed from the voltage of the reference power VREF to the voltage of the data signal.

The voltage of the first node N1 is changed corresponding to a voltage change amount of the second node N2 by coupling of the first capacitor C1. In an embodiment, the voltage of the first node N1 may be changed by a voltage corresponding to a difference between the voltage of the data signal and the reference power VREF, for example. Here, since the voltage of the reference power VREF is set to a fixed voltage, the voltage applied to the first node N1 may be determined by the voltage of the data signal.

The second capacitor C2 stores the voltage of the data signal applied to the second node N2.

In the disclosure, the fifth period P5 in which the voltage of the data signal is input does not overlap the first period P1 to the fourth period P4 in which the threshold voltage is compensated. Therefore, even though the fifth period P5 (or one horizontal period) in which the voltage of the data signal is input is shortened, a threshold voltage compensation period (that is, the first period P1 to the fourth period P4) may be sufficiently secured. Therefore, the display device 1000 of the disclosure may implement a display device of high-resolution and display an image at a relatively high scan rate (or driving frequency).

Figure 9:
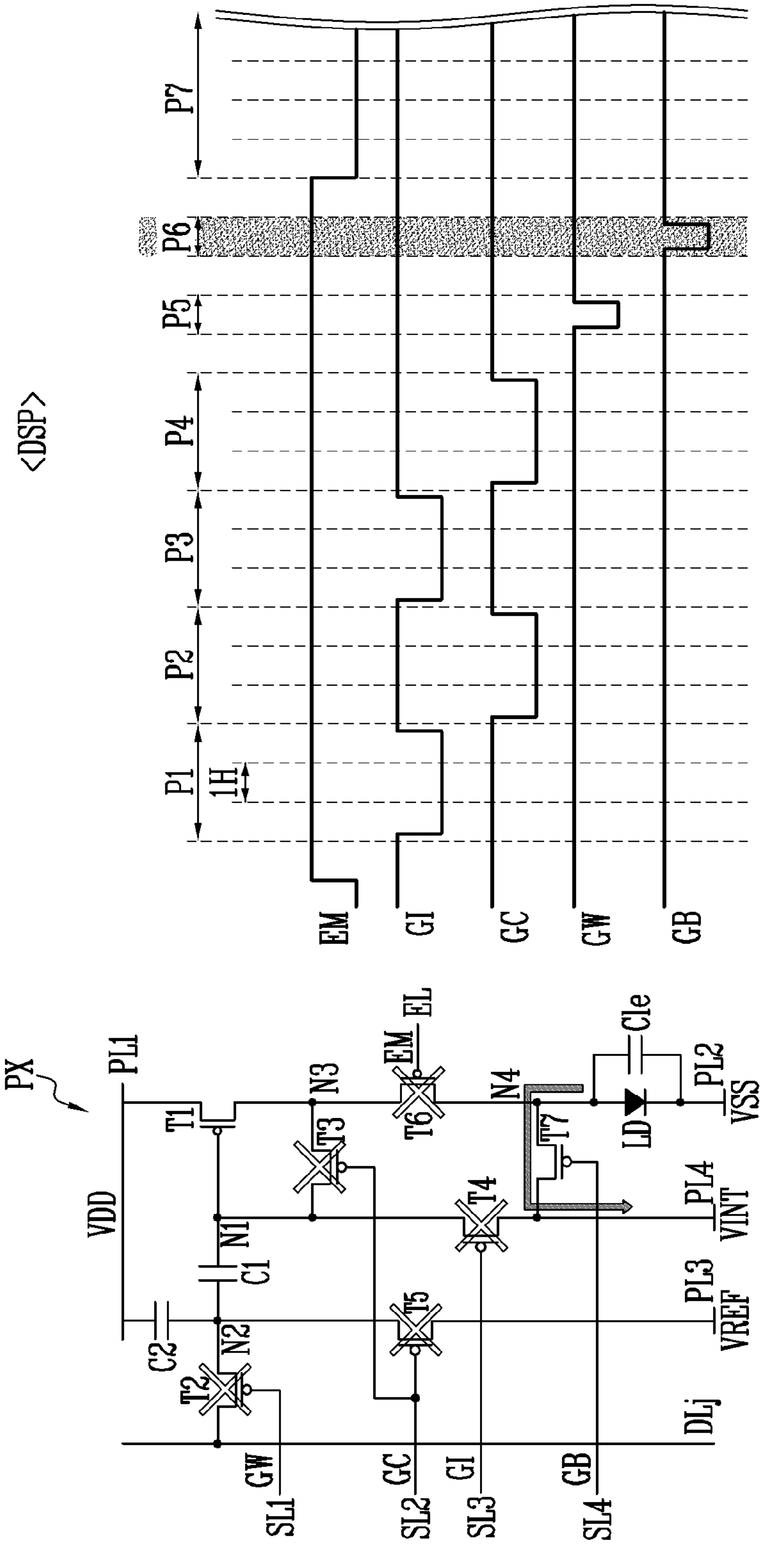
FIG. 9 is a diagram illustrating a sixth period of FIG. 3 together with the pixel of FIG. 2.

FIG. 9 is a diagram illustrating the sixth period of FIG. 3 together with the pixel of FIG. 2.

Referring to FIG. 9, in the sixth period P6, the fourth scan signal GB is supplied to the fourth scan line SL4. When the fourth scan signal GB is supplied to the fourth scan line SL4, the seventh transistor T7 is turned on. When the seventh transistor T7 is turned on, the voltage of the initialization power VINT may be supplied to the fourth node N4. When the voltage of the initialization power VINT is supplied to the fourth node N4, a charged voltage of the organic capacitor Cle may be discharged.

Figure 10:
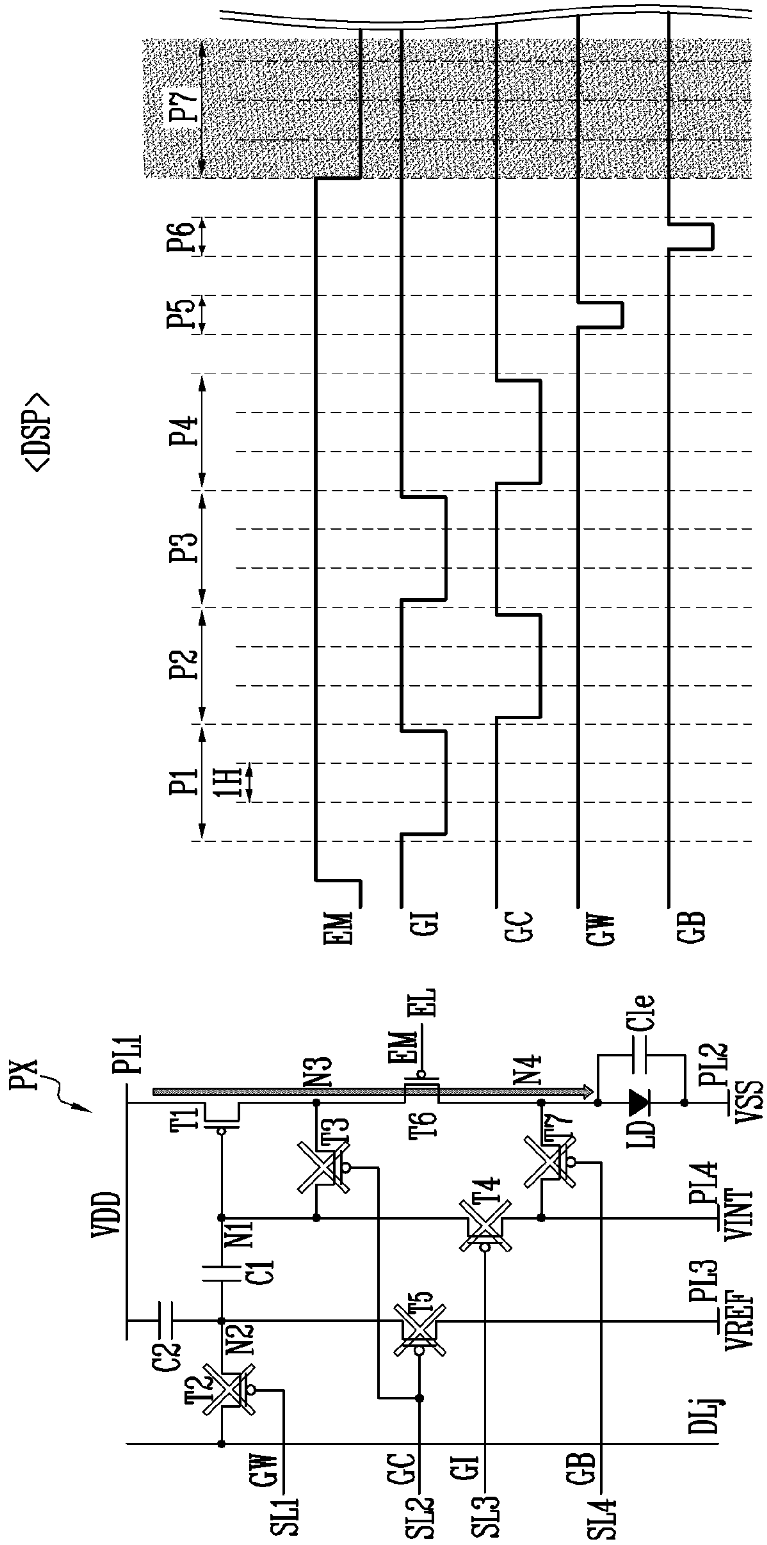
FIG. 10 is a diagram illustrating a seventh period of FIG. 3 together with the pixel of FIG. 2.

FIG. 10 is a diagram illustrating the seventh period of FIG. 3 together with the pixel of FIG. 2.

Referring to FIG. 10, in the seventh period P7, supply of the emission control signal EM having the inactive level (e.g., high level) to the emission control line EL is stopped. When the supply of the emission control signal EM having the inactive level (e.g., high level) to the emission control line EL is stopped, the sixth transistor T6 is turned on.

When the sixth transistor T6 is turned on, the first transistor T1 and the light-emitting element LD are electrically connected. At this time, the first transistor T1 supplies the driving current corresponding to the voltage of the first node N1 to the second power VSS via the first power VDD, the sixth transistor T6, and the light-emitting element LD. Then, the light-emitting element LD generates light with a luminance corresponding to the driving current. Accordingly, the seventh period P7 may be also referred to as an emission period.

Figure 11:
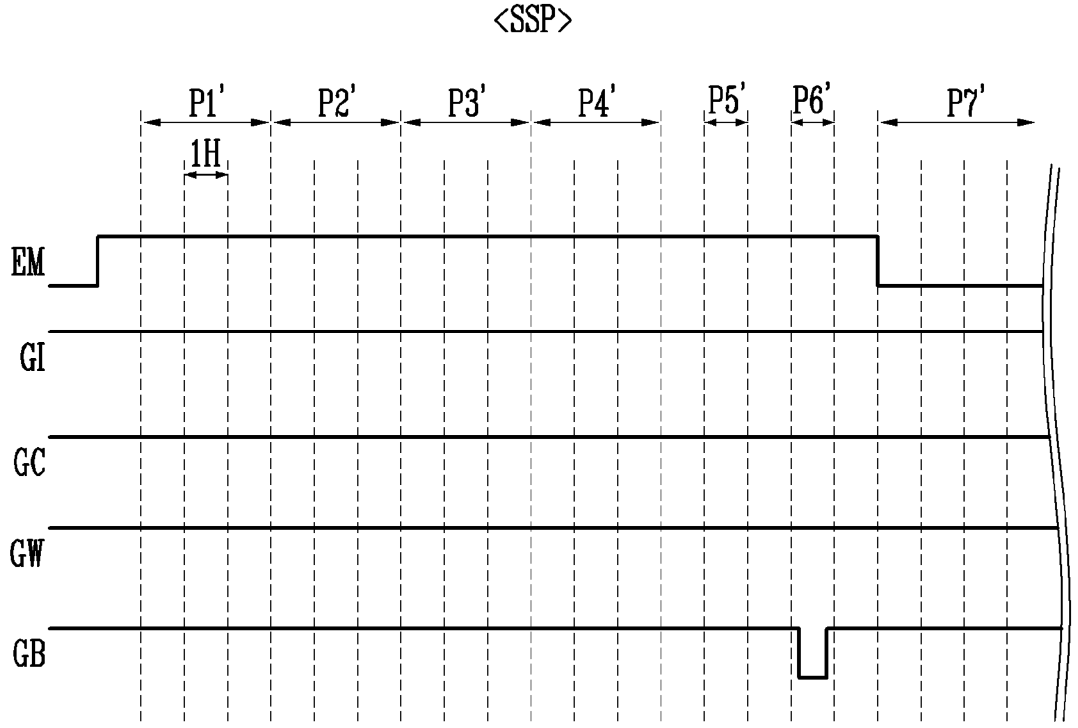
FIG. 11 is a waveform diagram illustrating a method of driving the pixel of FIG. 2 during a self-scan period.

FIG. 11 is a waveform diagram illustrating a method of driving the pixel of FIG. 2 during the self-scan period. The self-scan period SSP is a period in which an image is displayed again without switching a frame as a period in which light is emitted while maintaining a voltage of a previously supplied data signal. In an embodiment, one frame may include one display scan period DSP and one or more self-scan periods SSP. One or more self-scan periods SSP may be successively disposed after the display scan period DSP.

Compared to the display scan period DSP, the threshold voltage compensation operation and the data writing operation are omitted in the self-scan period SSP, and an operation of initializing the light-emitting element LD and an emission operation may be performed.

The self-scan period SSP may be set to the same length as the display scan period DSP. In this case, the self-scan period SSP may include a first period P1' to a seventh period P7'.

Figure 12:
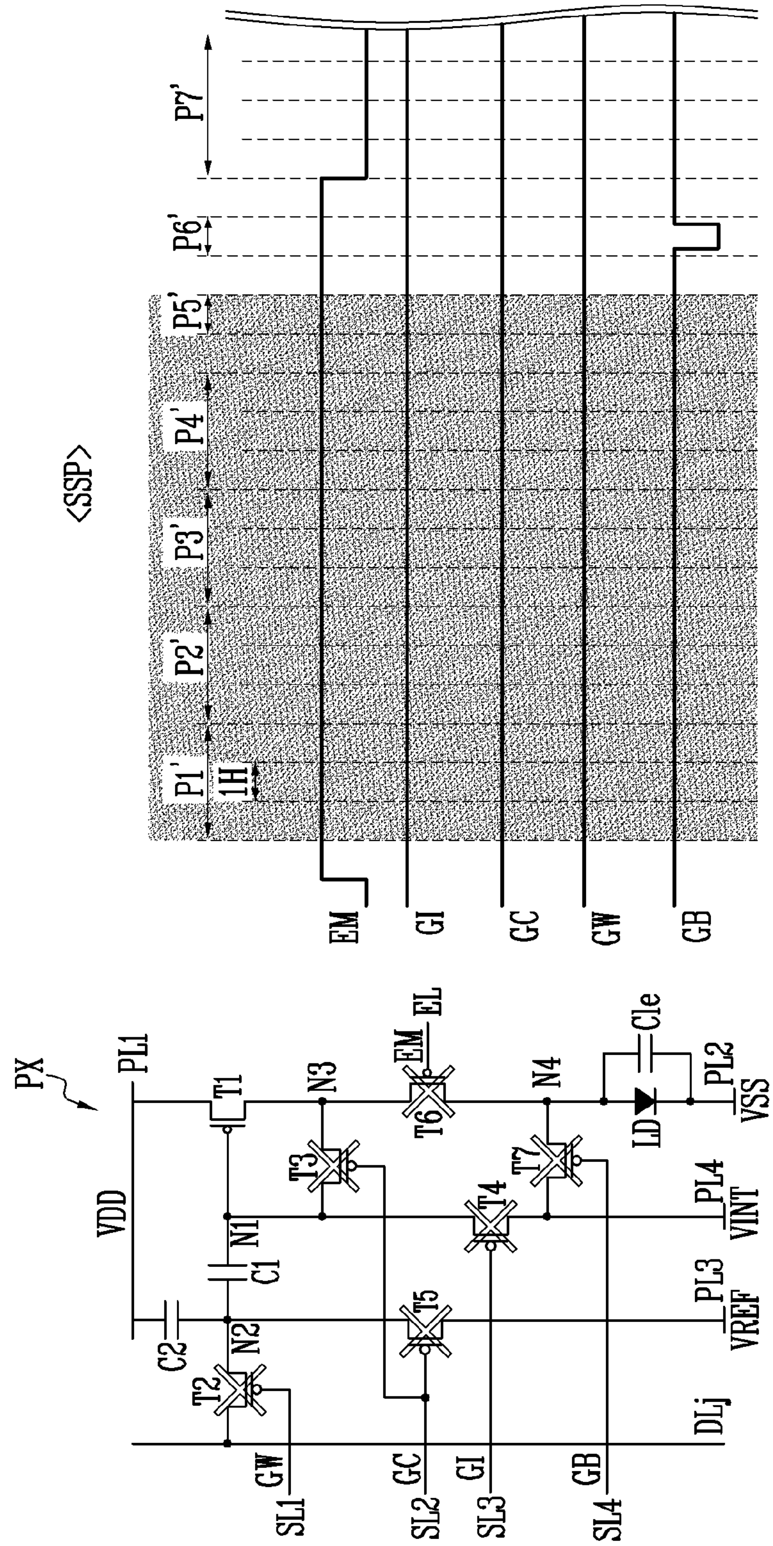
FIG. 12 is a waveform diagram illustrating a first period to a fifth period of FIG. 11.

FIG. 12 is a waveform diagram illustrating the first period to the fifth period of FIG. 11.

Referring to FIG. 12, the emission control signal EM having the inactive level (e.g., high level) is supplied to the emission control line EL in the first period P1' to the fifth period P5'. When the emission control signal EM having the inactive level (e.g., high level) is supplied to the emission control line EL, the sixth transistor T6 is turned off. When the sixth transistor T6 is turned off, electrical connection between the first transistor T1 and the light-emitting element LD is blocked, and thus the light-emitting element LD is set to the non-emission state. During the first period P1' to the fifth period P5', the scan signals GW, GC, GI, and GB are not supplied to the scan lines SL1 to SL4. Accordingly, during the first period P1' to the fifth period P5', the second transistor T2, the third transistor T3, the fourth transistor T4, the fifth transistor T5, and the seventh transistor T7 are set to a turn-off state.

Figure 13:
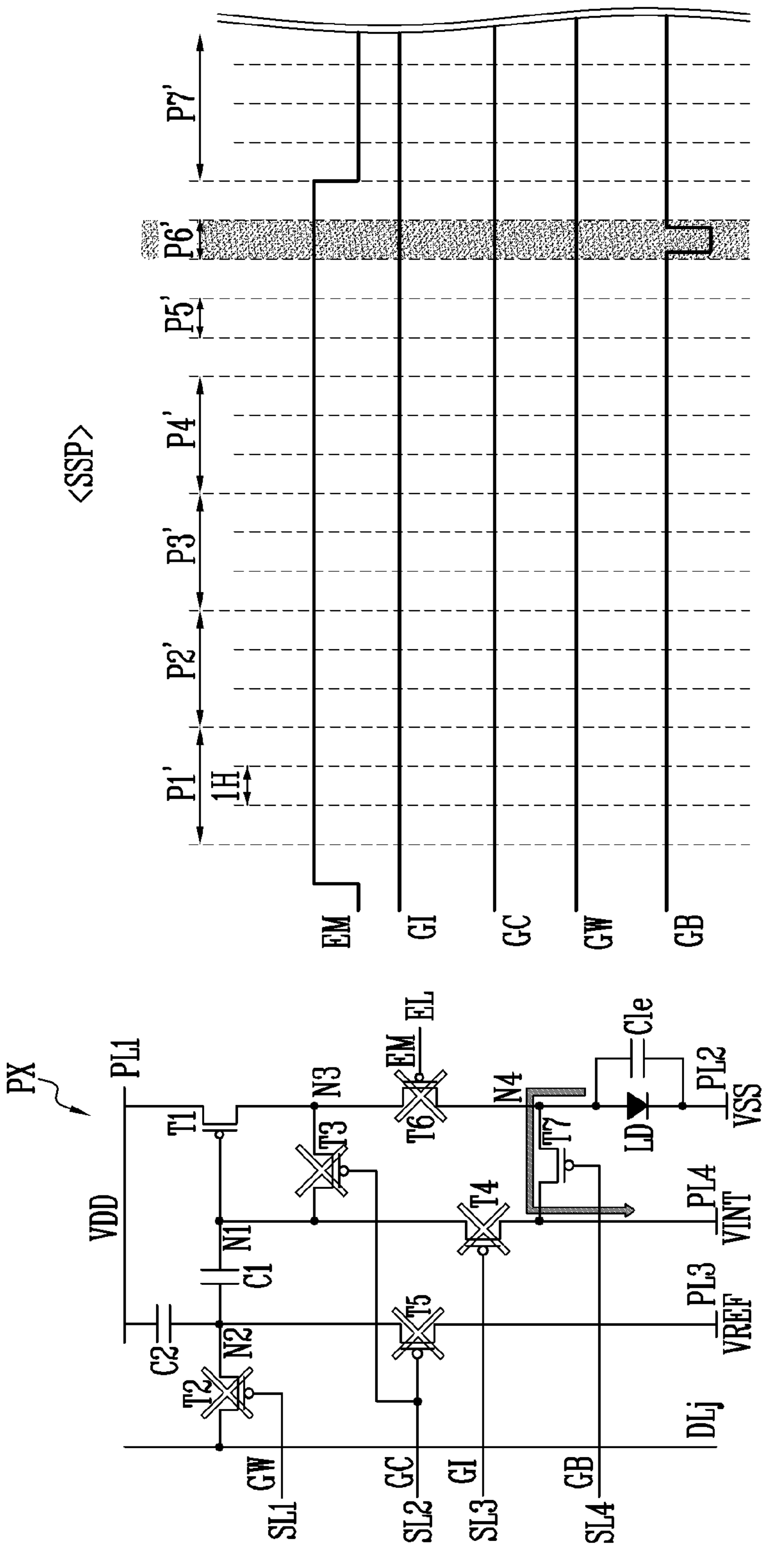
FIG. 13 is a waveform diagram illustrating a sixth period of FIG. 11.

FIG. 13 is a waveform diagram illustrating the sixth period of FIG. 11.

Referring to FIG. 13, in the sixth period P6', the fourth scan signal GB is supplied to the fourth scan line SL4. When the fourth scan signal GB is supplied to the fourth scan line SL4, the seventh transistor T7 is turned on. When the seventh transistor T7 is turned on, the voltage of the initialization power VINT may be supplied to the fourth node N4. When the voltage of the initialization power VINT is supplied to the fourth node N4, the charged voltage of the organic capacitor Cle may be discharged.

Figure 14:
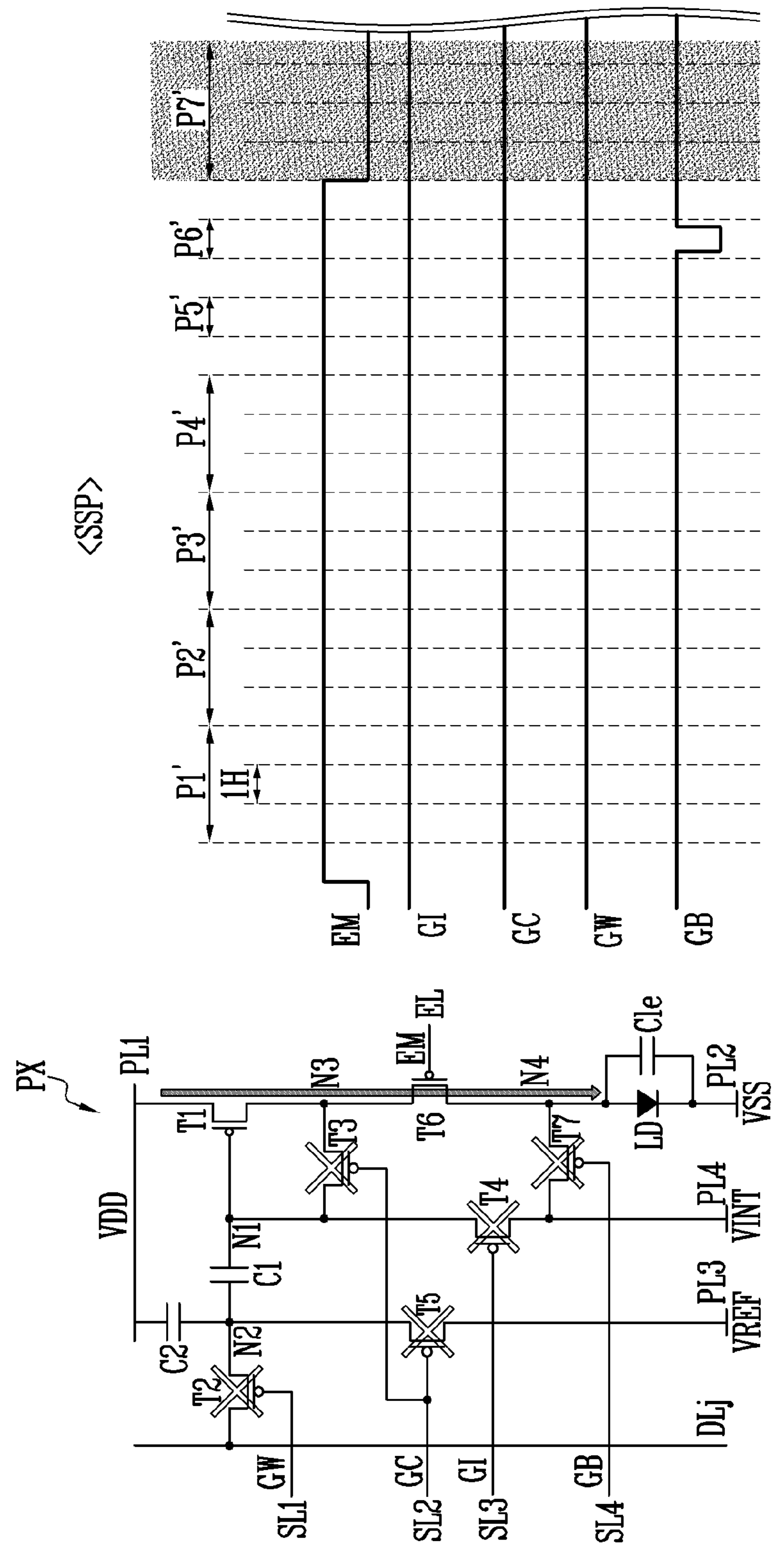
FIG. 14 is a waveform diagram illustrating a seventh period of FIG. 11.

FIG. 14 is a waveform diagram illustrating the seventh period of FIG. 11.

Referring to FIG. 14, in the seventh period P7', the supply of the emission control signal EM having the inactive level (e.g., high level) to the emission control line EL is stopped. When the supply of the emission control signal EM having the inactive level (e.g., high level) to the emission control line EL is stopped, the sixth transistor T6 is turned on.

When the sixth transistor T6 is turned on, the first transistor T1 and the light-emitting element LD are electrically connected. At this time, the first transistor T1 supplies the driving current corresponding to the voltage of the first node N1 to the second power VSS via the first power VDD, the sixth transistor T6, and the light-emitting element LD. Then, the light-emitting element LD generates light of a luminance corresponding to the driving current.

The display device 1000 according to the above-described embodiment of the disclosure may be driven at various driving frequencies (various frame frequencies) because one frame includes the display scan period DSP and the self-scan period SSP.

Figure 15:
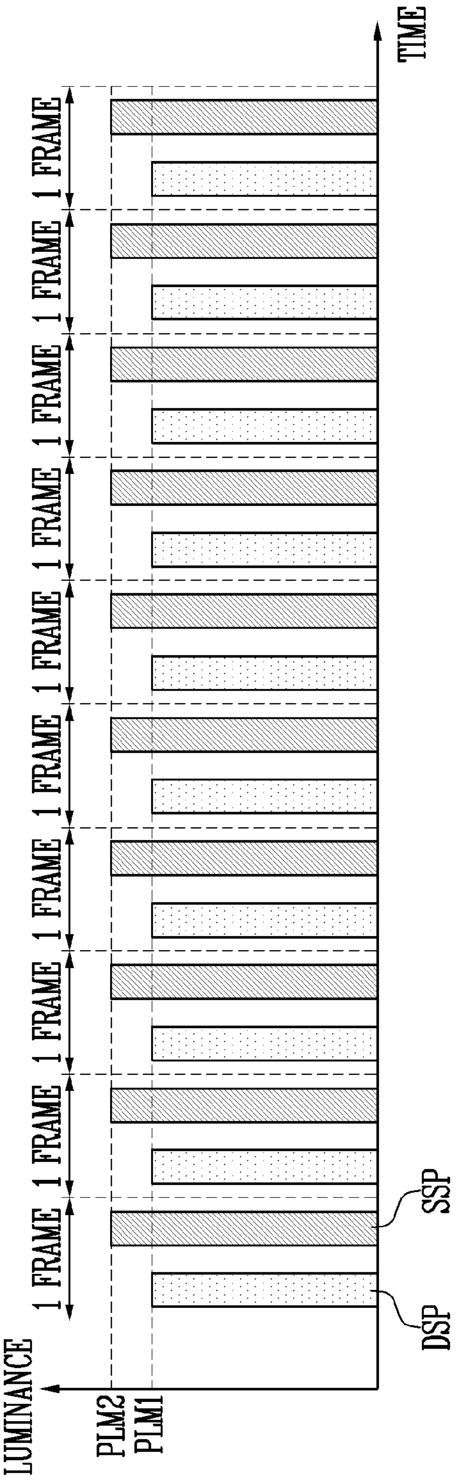
FIG. 15 is a diagram illustrating an embodiment of high-speed driving of a display device according to the disclosure.

FIG. 15 is a diagram illustrating an embodiment of high-speed driving of a display device according to the disclosure.

Referring to FIG. 15, during high-speed driving, one frame 1 FRAME may include one display scan period DSP and one self-scan period SSP. In an embodiment, a frequency of the high-speed driving may be set to 240 Hz, for example, but the disclosure is not limited thereto.

In an embodiment, when an image is displayed at a frame frequency of 240 Hz, each of the display scan period DSP and the self-scan period SSP may be 480 Hz. That is, in an embodiment of the disclosure, an image may be displayed by driving the display scan period DSP and the self-scan period SSP at a frequency higher than the driving frequency.

FIG. 15 illustrates peak luminances PLM1 and PLM2 of the display scan period DSP and the self-scan period SSP when the same data signal is successively supplied during 10 frame periods. A first peak luminance PLM1 is displayed in the display scan period DSP, and a second peak luminance PLM2 higher than the first peak luminance PLM1 is displayed in the self-scan period SSP.

Such a luminance difference may be caused by a characteristic change of the first transistor T1 due to the first power VDD supplied to the first electrode of the first transistor T1 during the first period P1' to the fourth period P4' of the self-scan period SSP. In addition, the luminance difference may be caused by a characteristic change due to a leakage current from the first node N1. In other words, the luminance difference due to the display scan period DSP and the self-scan period SSP may occur due to the characteristic change (or hysteresis) of the first transistor T1 during the self-scan period SSP and/or the leakage current from the first node N1, and thus a desired luminance may not be implemented in the pixel PX.

Figure 16:
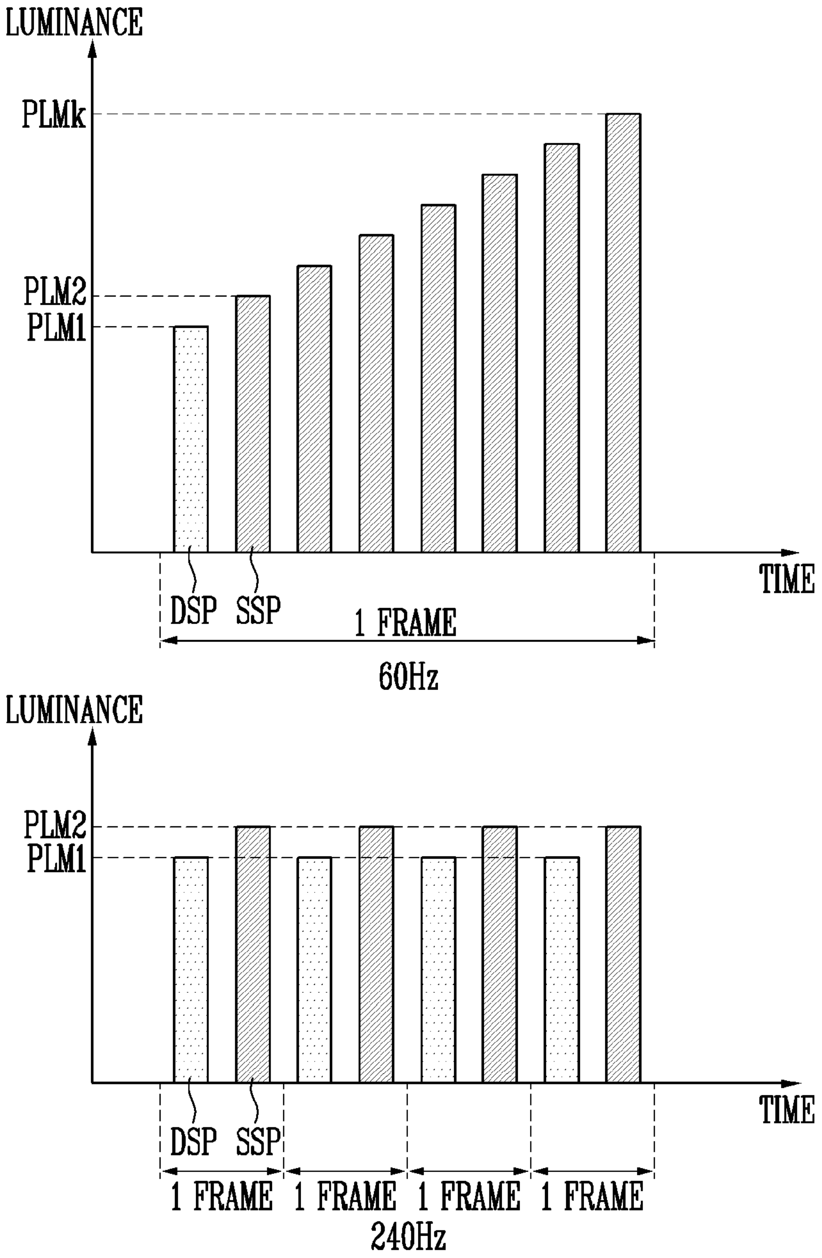
FIG. 16 is a diagram illustrating a luminance difference during the high-speed driving and the low-speed driving.

FIG. 16 is a diagram illustrating a luminance difference during the high-speed driving and the low-speed driving.

Referring to FIG. 16, a frequency of the high-speed driving may be set to 240 Hz, and a frequency of the low-speed driving may be set to 60 Hz, in an embodiment. In addition, it is assumed that the drawing of FIG. 16 is a case where that the same data signal is supplied during the high-speed driving and the low-speed driving.

When the display device 1000 is driven at the high-speed driving, one frame may include one display scan period DSP and one self-scan period SSP. When the display device 1000 is driven at the low-speed driving, one frame may include one display scan period DSP and seven self-scan periods SSP.

During the high-speed driving, one frame may display the first peak luminance PLM1 and the second peak luminance PLM2.

During the low-speed driving, the first peak luminance PLM1 may be displayed during the display scan period DSP of one frame, and the second peak luminance PLM2 may be displayed during the self-scan period SSP after the display scan period DSP. During remaining self-scan periods SSP, a peak luminance may gradually increase, and then a k-th (here, "k" is a natural number equal to or greater than 3) peak luminance PLMk may be displayed during a last self-scan period SSP. The k-th peak luminance PLMk is set to a luminance higher than that of the second peak luminance PLM2.

In an embodiment, seven self-scan periods SSP may be included in one frame during the low-speed driving, and one self-scan period SSP may be included in one frame during the high-speed driving. In this case, even though the same data signal is supplied, a luminance displayed during the high-speed driving and a luminance displayed during the low-speed driving may be set differently during the same time.

Figure 17:
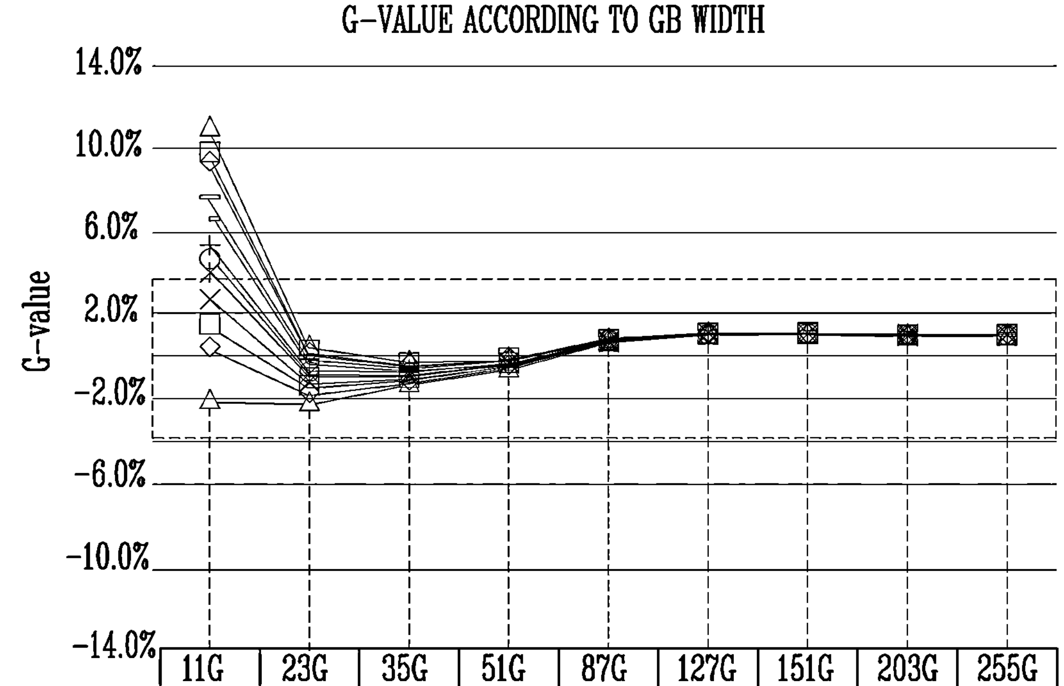
FIG. 17 is a diagram illustrating a G-value corresponding to a width of a fourth scan signal.

FIG. 17 is a diagram illustrating a G-value corresponding to a width of the fourth scan signal. Here, the G-value may be a value obtained by dividing a value obtained by subtracting a luminance of a lowest frequency (Lum(minfreq)) from a luminance of a highest frequency (Lum(maxfreq)) by the luminance of the highest frequency (Lum(maxfreq)) (e.g., Lum(maxfreq)−Lum(minfreq))/Lum(maxfreq)) and may be used as an authentication specification of the display device 1000 of which a frequency is changed. In FIG. 17, H-GB means the fourth scan signal GB supplied during the self-scan period SSP, and 11G, 23G, 35G, 51G, 87G, 127G, 151G, 203G, 255G, or the like means displayed grayscales. In addition, a portion displayed with a dotted line indicates a section included in a G-value specification. Here, the specification of the G-value may be set differently for each company.

Referring to FIG. 17, regardless of the width of the fourth scan signal GB, it may be included in the G-value specification at a relatively high grayscale (e.g., 23 grayscales (23G) or higher) (e.g., a G-value is stably maintained). Being included in the G-value specification may mean that a luminance difference does not largely occur during the high-speed driving and the low-speed driving, and thus the luminance difference is not recognized by a user.

However, in a relatively low grayscale (e.g., a grayscale of 15 grayscales (15G) or lower), the G-value largely changes in response to the width of the fourth scan signal GB. In an embodiment, in a case where the width of the fourth scan signal GB is set to be wide (e.g., a width of 1.4 μs or more) when implementing the relatively low grayscale, the G-Value may be included in the specification, and thus a desired luminance may be implemented during the high-speed driving and the low-speed driving. However, in a case where the width of the fourth scan signal GB is set narrow (e.g., less than 1.4 μs) when implementing the relatively low grayscale, the G-value is not included in the specification, and thus a luminance difference may occur during the high-speed driving and the low-speed driving. When it is not included in the G-value specification, the luminance difference may be recognized by the user during the high-speed driving and the low-speed driving.

As described above, the width of the fourth scan signal GB is desired to be set sufficiently wide to satisfy the G-value specification during the high-speed driving and the low-speed driving. In this case, the width of the fourth scan signal GB may be set greater than one horizontal period (1H). That is, in an embodiment of the disclosure, the width of the fourth scan signal GB may be set greater than one horizontal period (1H) and shorter than two horizontal periods (2H).

Figure 18:
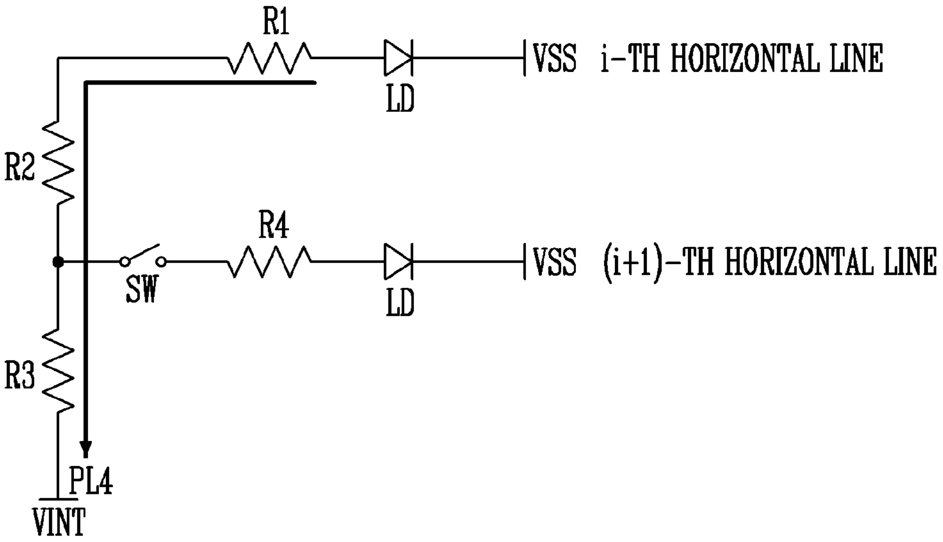
FIGS. 18 and 19 are diagrams equivalently illustrating a connection relationship between a light-emitting element and initialization power.
Figure 19:
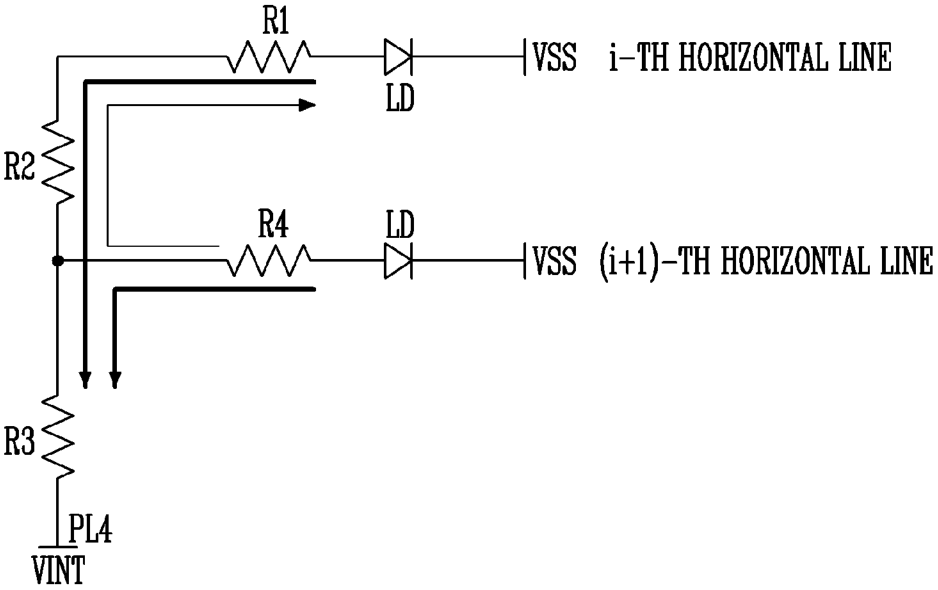

FIGS. 18 and 19 are diagrams equivalently illustrating a connection relationship between the light-emitting element and the initialization power. In FIG. 18, resistors R1, R2, R3, and R4 equivalently indicate a resistance of a line and a transistor (e.g., T7).

FIG. 18 illustrates a case where the fourth scan signal GB has a width within one horizontal period (1H), and thus the fourth scan signal GB supplied to the i-th horizontal line does not overlap the fourth scan signal GB supplied to an (i+1)-th horizontal line. FIG. 19 illustrates a case where the fourth scan signal GB has a width exceeding one horizontal period (1H), and thus the fourth scan signal GB supplied to the i-th horizontal line overlaps the fourth scan signal GB supplied to the (i+1)-th horizontal line. Thereafter, a period in which the fourth scan signal GB supplied to the i-th horizontal line and the fourth scan signal GB supplied to the (i+1)-th horizontal line are simultaneously supplied is also referred to as an overlap period.

Referring to FIG. 18, when the fourth scan signal GB is supplied to the i-th horizontal line, the seventh transistor T7 disposed on a corresponding horizontal line is turned on. Then, the anode electrode of the light-emitting element LD and the fourth power line PL4 are electrically connected, and thus the anode electrode of the light-emitting element LD disposed on the i-th horizontal line may be initialized.

Referring to FIG. 19, when the fourth scan signal GB is supplied to the i-th horizontal line, the seventh transistor T7 disposed on the corresponding horizontal line is turned on. Then, the anode electrode of the light-emitting element LD and the fourth power line PL4 are electrically connected, and thus the anode electrode of the light-emitting element LD disposed on the i-th horizontal line may be initialized.

In addition, the fourth scan signal GB is supplied to the (i+1)-th horizontal line during a partial period (that is, the overlap period) of a period in which the fourth scan signal GB is supplied to the i-th horizontal line. When the fourth scan signal GB is supplied to the (i+1)-th horizontal line, the seventh transistor T7 disposed on the (i+1)-th horizontal line is turned on. Then, the anode electrode of an (i+1)-th light-emitting element LD and the fourth power line PL4 are electrically connected. During the overlap period, the anode electrode of the light-emitting element LD disposed on the (i+1)-th horizontal line is electrically connected to the anode electrode of the light-emitting element LD disposed on the i-th horizontal line. At this time, when the overlap period is set to be relatively short, a voltage of the anode electrode of the light-emitting element LD disposed on the i-th horizontal line may temporarily increase, and thus a luminance reversal phenomenon may occur.

Figure 20A:
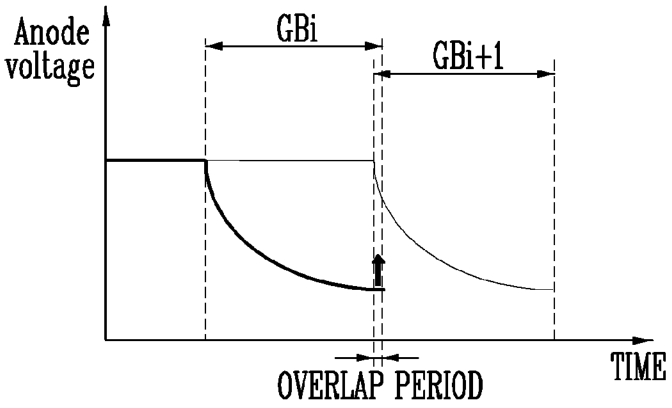
FIGS. 20A and 20B are diagrams illustrating a case where a luminance reversal phenomenon occurs in relation to FIG. 19.
Figure 20B:
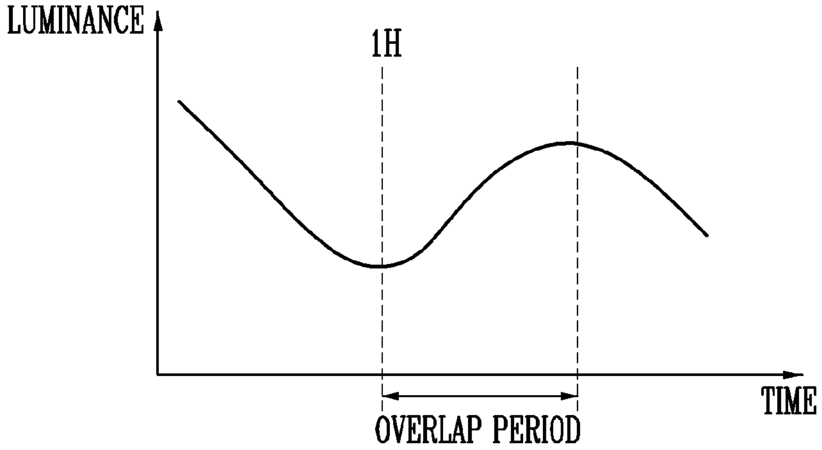
Figure 21:
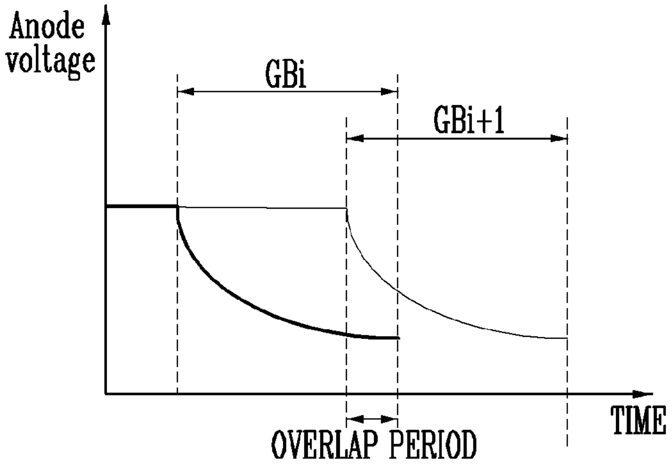
FIG. 21 is a diagram illustrating a case where the luminance reversal phenomenon does not occur in relation to FIG. 19.

FIGS. 20A and 20B are diagrams illustrating a case where the luminance reversal phenomenon occurs in relation to FIG. 19. FIG. 21 is a diagram illustrating a case where the luminance reversal phenomenon does not occur in relation to FIG. 19.

FIG. 20A illustrates a case where the overlap period is short, and FIG. 20B is a diagram illustrating a luminance of the light-emitting element corresponding to the overlap period of FIG. 20A.

Referring to FIGS. 20A and 20B, an i-th fourth scan signal GBi and an (i+1)-th fourth scan signal GBi+1 may be simultaneously supplied during the overlap period. At this time, when the overlap period is set to be relatively short, an anode electrode voltage of the light-emitting element LD disposed on the (i+1)-th horizontal line is supplied to the anode electrode of the light-emitting element LD disposed on the i-th horizontal line as shown in FIG. 20, and thus an anode electrode voltage of the light-emitting element LD disposed on the i-th horizontal line is increased. At this time, when the overlap period is set to be relatively short, the anode electrode voltage of the light-emitting element LD disposed on the i-th horizontal line may be increased and then may not be discharged, and thus the luminance of the light-emitting element LD disposed on the i-th horizontal line may be increased.

Referring to FIG. 21, the i-th fourth scan signal GBi and the (i+1)-th fourth scan signal GBi+1 may be simultaneously supplied during the overlap period. At this time, when the overlap period is set to be relatively long, the voltage of the light-emitting element LD disposed on the i-th horizontal line temporarily is increased and then is decreased due to the voltage of the initialization power VINT. That is, when the overlap period is set to be relatively long, the luminance reversal phenomenon as shown in FIG. 20B may not occur, and thus a desired luminance may be stably implemented. In an embodiment, when the fourth scan signal GB is supplied during a sufficiently long time, the voltage of the light-emitting element LD may be decreased to the voltage of the initialization power VINT, and thus an image of a uniform luminance may be implemented during the display scan period DSP and self-scan period SSP.

As described above, when the overlap period of the fourth scan signal GB is sufficiently long, the luminance reversal phenomenon of the light-emitting element LD may be prevented. In addition, when the fourth scan signal GB does not overlap, the luminance reversal phenomenon does not occur. In addition, as shown in FIG. 17, when the fourth scan signal GB is applied during a sufficiently long time, the G-value specification may be satisfied, and thus the luminance difference may be minimized during the high-speed driving and the low-speed driving.

In an embodiment of the disclosure, a method capable of preventing the luminance reversal phenomenon while setting the overlap period of the fourth scan signal GB sufficiently wide using such a characteristic is proposed.

Figure 22:
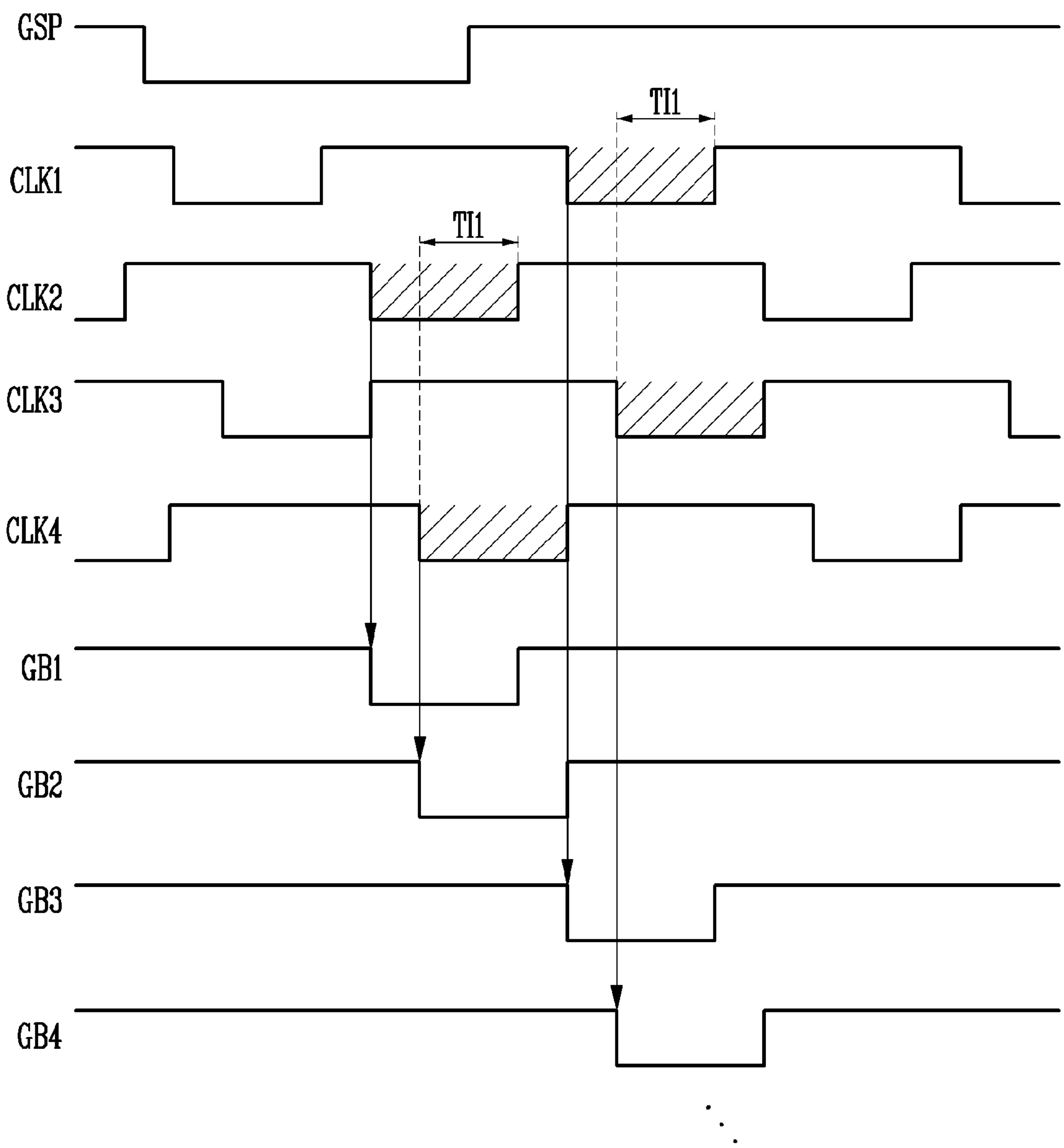
FIGS. 22 and 23 are diagrams illustrating an embodiment of a supply waveform of a fourth scan signal according to the disclosure.
Figure 23:
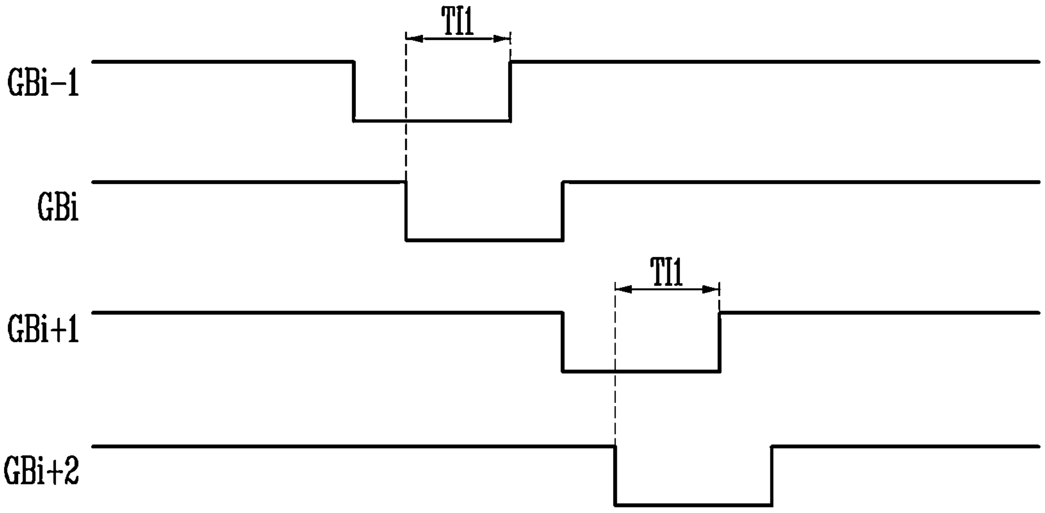

FIGS. 22 and 23 are diagrams illustrating an embodiment of a supply waveform of a fourth scan signal according to the disclosure.

In FIG. 22, GSP may mean a fourth scan start pulse (hereinafter referred to as a "scan start pulse") included in the fourth driving control signal SCS4 (refer to FIG. 1), and clock signals CLK1, CLK2, CLK3, and CLK4 may mean clock signals included in the fourth driving control signal SCS4.

A configuration of a stage generating the scan signal (that is, the fourth scan signal GB) while shifting the scan start pulse GSP using the clock signals CLK1 to CLK4 is currently known variously. In the disclosure, a configuration of a stage included in the fourth scan driver 500 and shifting the scan start pulse GSP using the clock signals CLK1 to CLK4 may be set to any one of various currently known configurations.

Referring to FIGS. 22 and 23, the first clock signal CLK1, the third clock signal CLK3, the second clock signal CLK2, and the fourth clock signal CLK4 may be sequentially supplied. Here, the first clock signal CLK1, the third clock signal CLK3, the second clock signal CLK2, and the fourth clock signal CLK4 may have the same period and may be supplied so that a phase is shifted.

The first clock signal CLK1 and the third clock signal CLK3 are supplied to overlap with each other during a first time TI1, and the second clock signal CLK2 and the fourth clock signal CLK4 are supplied to overlap with each other during the first time TI1. In addition, the first clock signal CLK1 and the fourth clock signal CLK4 do not overlap, and the second clock signal CLK2 and the third clock signal CLK3 do not overlap.

As shown in FIG. 22, the second clock signal CLK2, the fourth clock signal CLK4, the first clock signal CLK1, and the third clock signal CLK3 may be sequentially output as the fourth scan signal GB.

In this case, the i-th fourth scan signal GBi overlaps an (i−1)-th fourth scan signal GBi−1 and does not overlap (i+1)-th fourth scan signal GBi+1. In an embodiment, the i-th fourth scan signal GBi may overlap the (i−1)-th fourth scan signal GBi−1 during the first time TI1, for example. In addition, the (i+1)-th fourth scan signal GBi+1 may not overlap the i-th fourth scan signal GBi and may overlap an (i+2)-th fourth scan signal GBi+2 during the first time TI1. Actually, in the disclosure, the fourth scan signal GB may be supplied as shown in FIG. 23 in response to the clock signals CLK1 to CLK4.

That is, in the disclosure, the fourth scan signal supplied to a predetermined fourth scan line overlaps any one of the fourth scan signal supplied first and the fourth scan signal supplied later, and does not overlap the other one.

In an embodiment, the i-th fourth scan signal GBi may overlap the (i−1)-th fourth scan signal GBi−1 during the first time TI1 which is a sufficiently long time, and thus the G-value may be satisfied without the luminance reversal phenomenon. In addition, the (i+1)-th fourth scan signal (GBi+1) may be supplied during a sufficiently long time without overlapping the i-th fourth scan signal GBi, and thus may satisfy the G-value without the luminance reversal phenomenon.

In an embodiment of the disclosure, the width of the fourth scan signal may be set differently according to the driving frequency.

Figure 24:
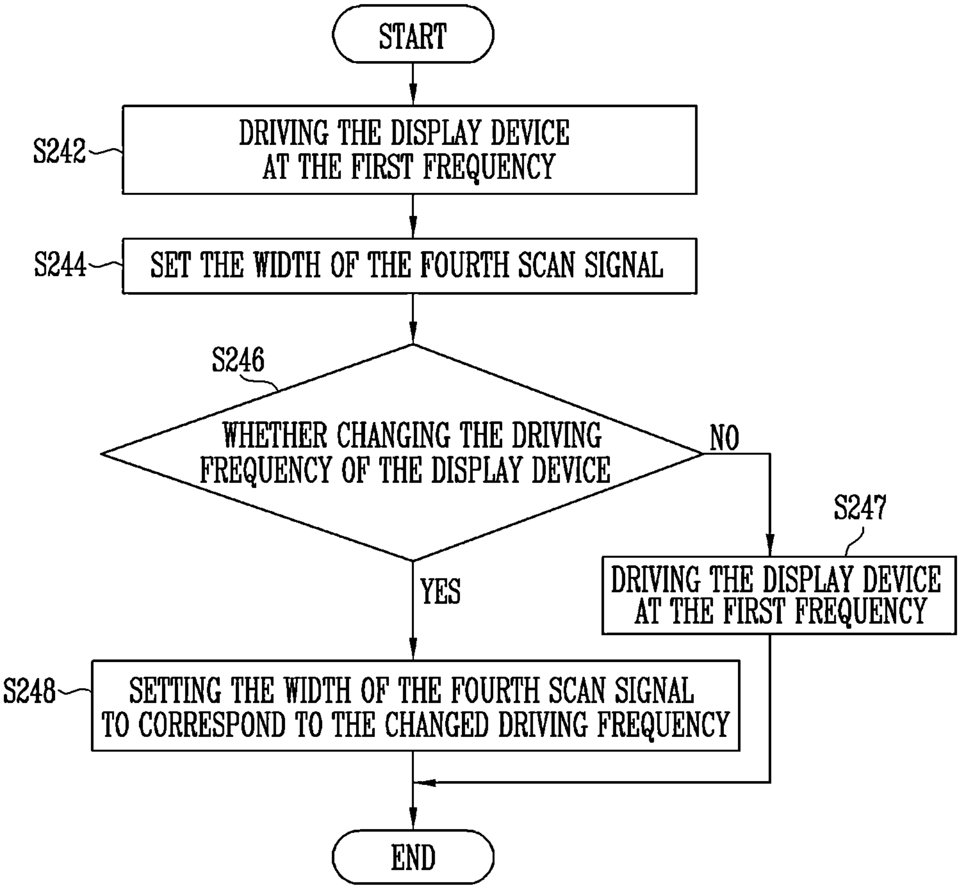
FIG. 24 is a diagram illustrating an embodiment of a process of setting a width of a fourth scan signal according to the disclosure.
Figure 25:
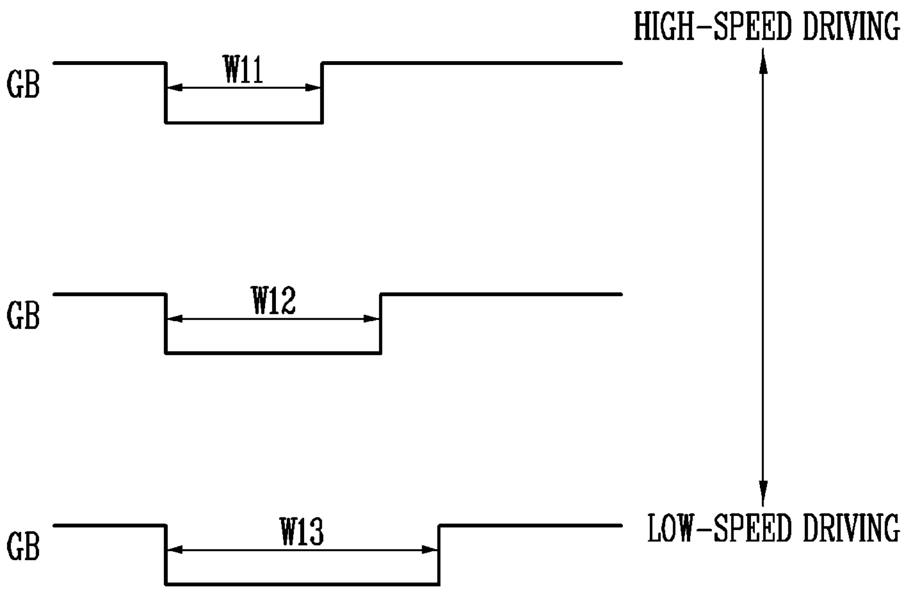
FIG. 25 is a diagram illustrating an embodiment of the width of the fourth scan signal corresponding to a driving frequency.

FIG. 24 is a diagram illustrating an embodiment of a process of setting a width of a fourth scan signal according to the disclosure. FIG. 25 is a diagram illustrating an embodiment of the width of the fourth scan signal corresponding to the driving frequency.

Referring to FIGS. 1 and 24, first, the timing controller 800 sets a frequency at which the display device 1000 is driven. In an embodiment, the timing controller 800 may drive the display device 1000 at a first frequency (S242), for example. After the frequency to be driven is set in operation S242, the timing controller 800 sets the width of the fourth scan signal GB in response to the corresponding frequency (S244). At this time, as shown in FIG. 25, the timing controller 800 may set the width of the fourth scan signal GB to have a first width W11 at a high-speed driving frequency (that is, a relatively high driving frequency). In addition, the timing controller 800 may set the width of the fourth scan signal GB greater as the driving frequency is decreased.

In an embodiment, at an intermediate driving frequency, the fourth scan signal GB may be set to have a second width W12 greater than the first width W11, and at a relatively low driving frequency, the fourth scan signal GB may be set to have a third width W13 greater than the second width W12, for example. As described above, when the width of the fourth scan signal GB is widened at the relatively low driving frequency, the luminance difference between the high-speed driving and the low-speed driving may be minimized. At this time, as shown in FIG. 23, the fourth scan signal supplied to the predetermined fourth scan line may be supplied so as to overlap any one of the fourth scan signal supplied first and the fourth scan signal supplied later and so as not to overlap the other one.

After the width of the fourth scan signal GB is set in operation S244, the timing controller 800 may supply the driving control signals SCS1, SCS2, SCS3, SCS4, ECS, and DCS corresponding thereto to the scan drivers 200, 300, 400, and 500, the emission driver 600, and the data driver 700, respectively. Then, a predetermined image may be displayed at the first frequency in the pixel unit 100.

Thereafter, the timing controller 800 determines whether the driving frequency of the display device 1000 is changed (S246). When the driving frequency is not changed in operation S246, the timing controller 800 drives the display device 1000 at the first frequency (S247).

When the driving frequency is changed in operation S246, the timing controller 800 may set the width of the fourth scan signal GB to correspond to the changed driving frequency (S248), and supply the driving control signals SCS1, SCS2, SCS3, SCS4, ECS, and DCS corresponding thereto to the scan drivers 200, 300, 400, and 500, the emission driver 600, and the data driver 700, respectively. Then, a predetermined image may be displayed at the changed frequency in the pixel unit 100.

In FIG. 25, the width of the fourth scan signal GB is shown as the first width W11, the second width W12, and the third width W13 in response to the driving frequency, but the disclosure is not limited thereto. In an embodiment, the fourth scan signal GB may be set to have at least two different widths in response to the driving frequency, for example.

Figure 26:
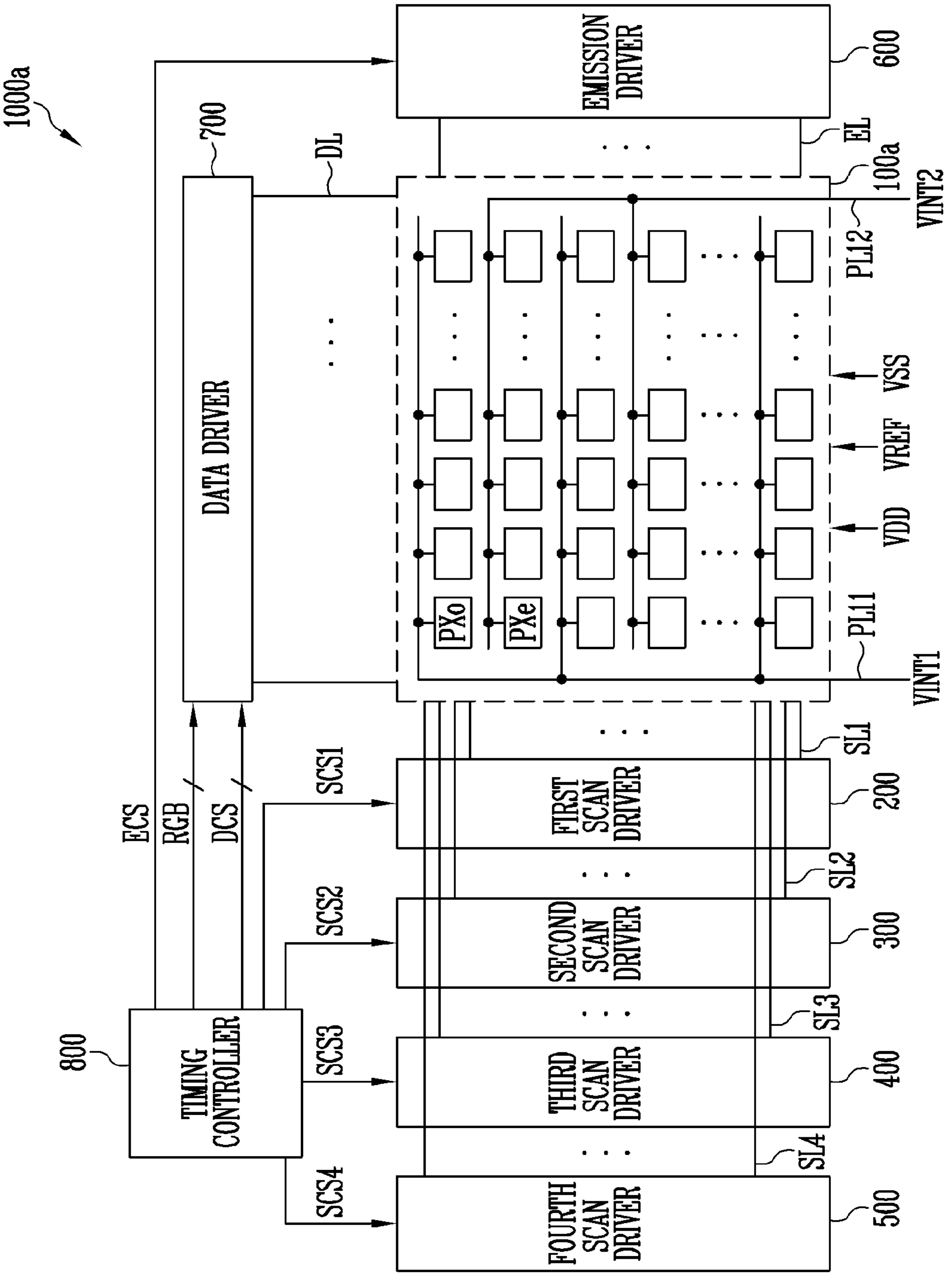
FIG. 26 is a diagram illustrating an embodiment of a display device.
Figure 27:
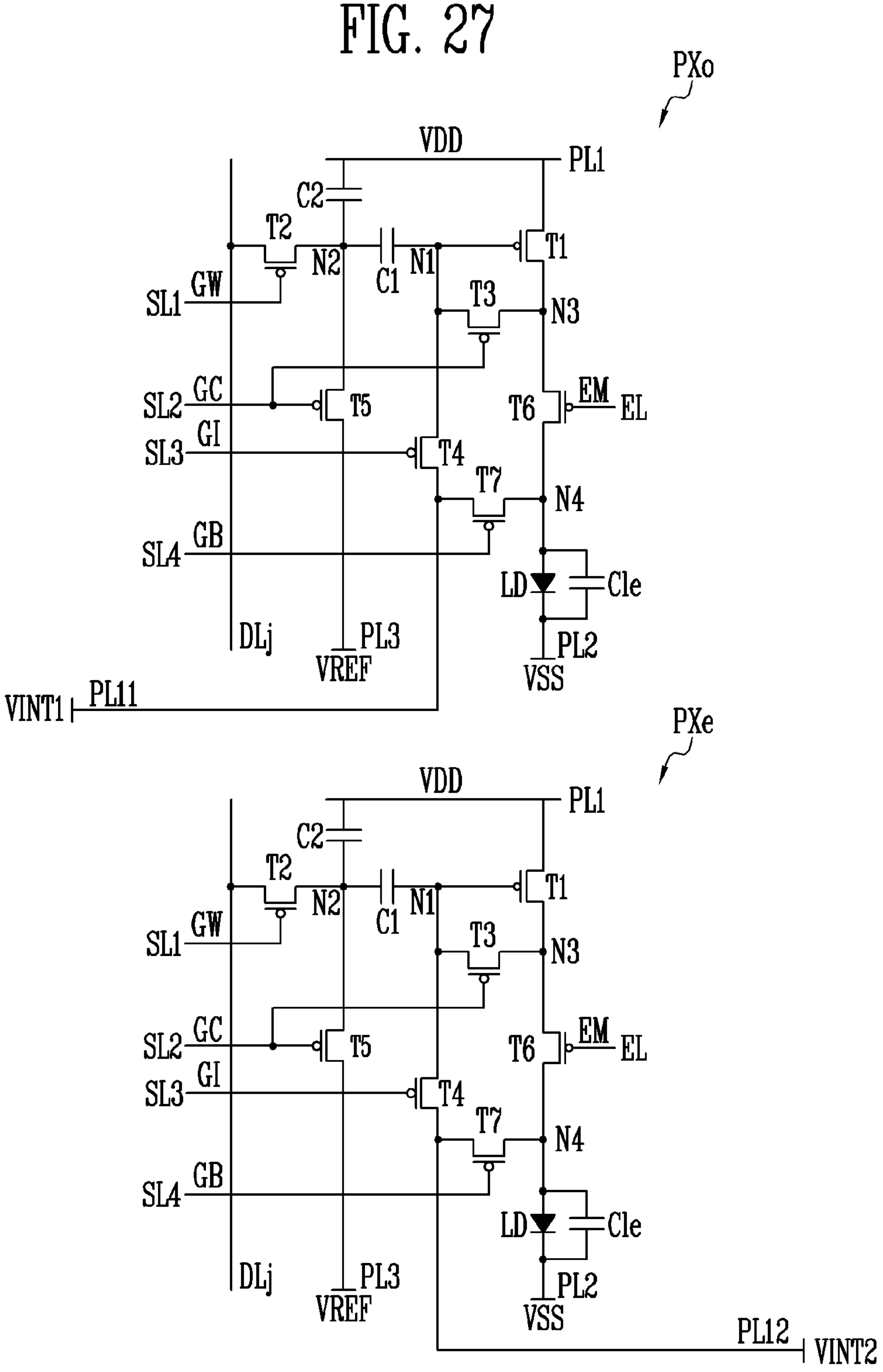
FIG. 27 is a diagram illustrating an embodiment of pixels disposed in the display device of FIG. 26.

FIG. 26 is a diagram illustrating an embodiment of a display device. FIG. 27 is a diagram illustrating an embodiment of pixels disposed in the display device of FIG. 26.

When describing FIGS. 26 and 27, the same reference numerals are assigned to the same configurations as those in FIG. 1, and a repetitive description is omitted.

Referring to FIGS. 26 and 27, a display device 1000*a* in an embodiment of the disclosure includes a pixel unit 100*a*, the scan drivers 200, 300, 400, and 500, the emission driver 600, the data driver 700, and the timing controller 800.

In an embodiment, the display device 1000*a* may include a power supply for supplying the voltage of the first power VDD, the voltage of the second power VSS, a voltage of first initialization power VINT1, a voltage of second initialization power VINT2, and the voltage of the reference power VREF to the pixel unit 100*a*.

The voltage of the first initialization power VINT1 may be supplied to a first power line PL11, and the voltage of the second initialization power VINT2 may be supplied to a second power line PL12. The first power line PL11 may be electrically connected to pixels PXo (or first pixels) disposed on an odd-numbered (or even-numbered) horizontal line, and the second power line PL12 may be electrically connected to pixels PXe (or second pixels) disposed on an even-numbered (or odd-numbered) horizontal line. Here, the first power line PL11 and the second power line PL12 are not electrically connected to each other. In addition, the first initialization power VINT1 may be set to the same voltage value as the second initialization power VINT2.

As shown in FIG. 27, a light-emitting element LD (or a first light-emitting element) of the pixel PXo disposed on the odd-numbered horizontal line may be connected to the first power line PL11 via the seventh transistor T7 (or the first initialization transistor). In addition, a light-emitting element LD (or a second light-emitting element) of the pixel PXe disposed on the even-numbered horizontal line may be connected to the second power line PL12 via the seventh transistor T7 (or the second initialization transistor). As described above, when the pixels PXo and PXe disposed on the odd-numbered horizontal line and the even-numbered horizontal line are supplied with the different initialization power VINT1 and VINT2, the luminance reversal phenomenon does not occur regardless of the overlap period of the fourth scan signal GB.

Figure 28:
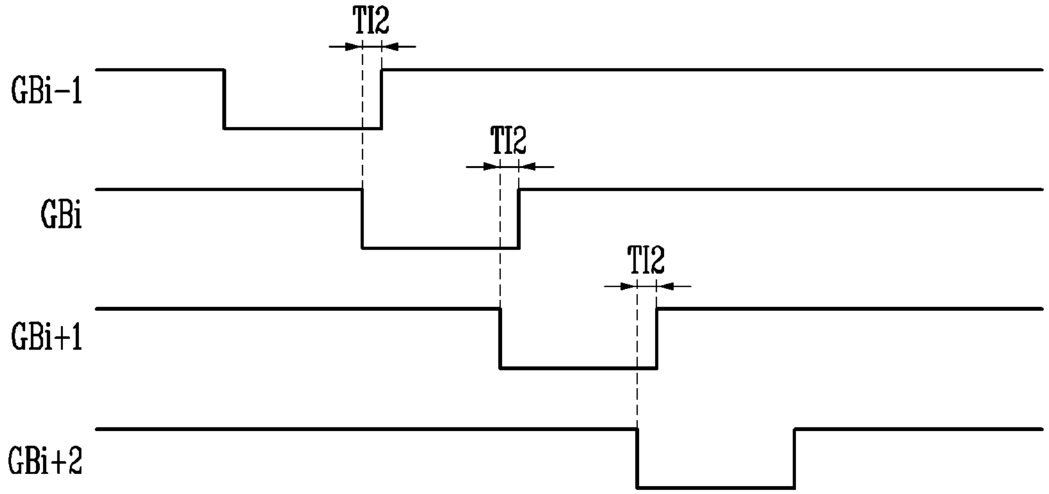
FIG. 28 is a diagram illustrating the fourth scan signal corresponding to the embodiment of FIG. 26.
Figure 29:
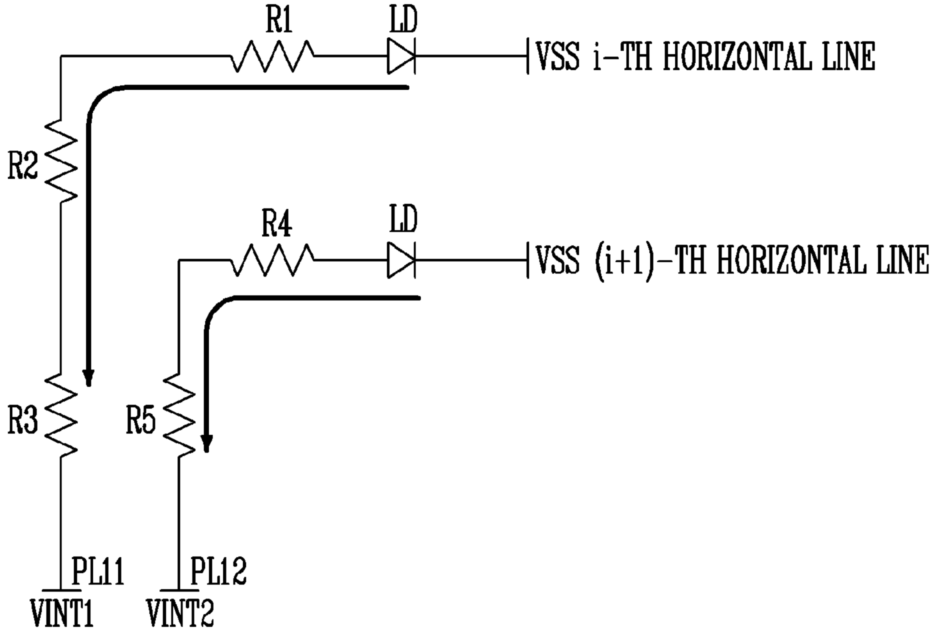
FIG. 29 is a diagram equivalently illustrating a flow of a current during a second time.

FIG. 28 is a diagram illustrating the fourth scan signal corresponding to the embodiment of FIG. 26. FIG. 29 is a diagram equivalently illustrating a flow of a current during a second time.

Referring to FIGS. 28 and 29, in an embodiment of the disclosure, the fourth scan signal overlaps the previously supplied fourth scan signal during a second time TI2. Here, the second time TI2 may be experimentally set so that the display device 1000 satisfies the G-value. In an embodiment, the i-th fourth scan signal GBi may overlap the (i−1)-th fourth scan signal GBi−1 during the second time TI2, for example. In addition, the (i+1)-th fourth scan signal GBi+1 may overlap the i-th fourth scan signal GBi during the second time TI2. Here, even though the second time TI2 is set to a relatively short time, the luminance reversal phenomenon does not occur.

In detail, in an embodiment of the disclosure, the pixels PXo disposed on the odd-numbered (or even-numbered) horizontal line receive the first initialization power VINT1 from the first power line PL11, and the pixels PXe disposed on the even-numbered (or odd-numbered) horizontal line receive the second initialization power VINT2 from the second power line PL12.

In an embodiment, when the i-th fourth scan signal GBi is supplied, a seventh transistor T7 disposed on the i-th horizontal line is turned on. Then, a light-emitting element LD disposed on the i-th horizontal line is electrically connected to the first power line PL11 and initialized by a voltage of the first initialization power VINT1 supplied from the first power line PL11.

When the (i+1)-th fourth scan signal GBi+1 is supplied, a seventh transistor T7 disposed on the (i+1)-th horizontal line is turned on. Then, a light-emitting element LD disposed on the (i+1)-th horizontal line is initialized by a voltage of the second initialization power VINT2 supplied from the second power line PL12. In the embodiment, resistors R4 and R5 equivalently indicate a resistance of the (i+1)-th horizontal line.

Even though the i-th fourth scan signal GBi and the (i+1)-th fourth scan signal GBi+1 overlap, the light-emitting element LD disposed on the (i+1)-th horizontal line and the light-emitting element LD disposed on the i-th horizontal line are not electrically connected, and thus the luminance reversal phenomenon may be prevented. That is, in the embodiment of the disclosure shown in FIG. 26, the overlap period (or the second time TI2) of the fourth scan signal GB may be freely controlled regardless of the luminance reversal phenomenon.

Although the above has been described with reference to the embodiments of the disclosure, those skilled in the art will understand that the disclosure may be variously corrected and modified within the scope without departing from the spirit and scope of the disclosure described in the claims.

What is claimed is:

1. A display device comprising:
- a first initialization power line to which a voltage of initialization power is supplied;
- pixels including:
  - a light-emitting element including an anode electrode; and
  - an initialization transistor connected between the anode electrode of the light-emitting element and the first initialization power line, and turned on when an initialization scan signal is supplied; and
- an initialization scan driver which supplies the initialization scan signal,
- wherein the initial scan driver supplies an i-th (i is a natural number) initial scan signal to overlap an (i−1)-th initial scan signal, and supplies an (i+1)-th initial scan signal so as not to overlap the i-th initial scan signal,
- wherein the initial scan driver supplies an (i+2)-th initial scan signal to overlap the (i+1)-th initial scan signal, and
- the initialization scan signal is set to a gate-on voltage.

2. The display device according to claim 1, wherein an overlap period between the (i−1)-th initial scan signal and the i-th initial scan signal and an overlap period between the (i+1)-th initial scan signal and the (i+2)-th initial scan signal are set to be identical to each other.

3. The display device according to claim 1, wherein a width of the initialization scan signal is set differently according to a driving frequency.

4. The display device according to claim 3, wherein the width of the initialization scan signal is set greater as the driving frequency is decreased.

5. The display device according to claim 1, further comprising:
- a timing controller which controls the initialization scan driver.

6. The display device according to claim 1, wherein each of the pixels comprises:
- a first transistor having a first electrode connected to a first power line to which first power is supplied, a second electrode connected to a third node, and a gate electrode connected to a first node;
- a second transistor connected between a data line and a second node, and having a gate electrode connected to a first scan line;
- a third transistor connected between the first node and the third node and having a gate electrode connected to a second scan line;
- a fourth transistor connected between the first node and the first initialization power line and having a gate electrode connected to a third scan line;
- a fifth transistor connected between the second node and a second initialization power line to which a voltage of reference power is supplied, and having a gate electrode connected to the second scan line;
- a sixth transistor connected between the third node and the anode electrode of the light-emitting element, and having a gate electrode connected to an emission control line;
- a first capacitor connected between the first node and the second node; and
- a second capacitor connected between the first power line and the second node.

7. The display device according to claim 6, wherein the light-emitting element further includes a cathode electrode, and
- wherein the anode electrode of the light-emitting element is connected to a common terminal of the sixth transistor and the initialization transistor, and the cathode electrode of the light-emitting element is connected to a second power line to which second power is supplied.

8. The display device according to claim 6, further comprising:

a first scan driver which supplies a first scan signal to the first scan line;

a second scan driver which supplies a second scan signal to the second scan line;

a third scan driver which supplies a third scan signal to the third scan line;

an emission driver which supplies an emission control signal to the emission control line; and a data driver which supplies a data signal to the data line.

9. The display device according to claim 8, wherein one frame period includes a display scan period and a self-scan period, the first scan signal, the second scan signal, the third scan signal, the initialization scan signal, and the emission control signal are supplied to the pixels during the display scan period, and the initial scan signal and the emission control signal are supplied to the pixels during the self-scan period.

10. A display device comprising:

an initialization power line to which a voltage of initialization power is supplied;

pixels including:

a light-emitting element including an anode electrode; and an initialization transistor connected between the anode electrode of the light-emitting element and the initialization power line, and turned on when an initialization scan signal is supplied to an initialization scan line connected to a gate electrode; and an initialization scan driver which sequentially supplies four initialization scan signals, that include a first scan signal and second scan signal that overlap one another, a third scan signal and fourth scan signal that overlap one another, wherein the second scan signal and the third scan signal do not overlap one another.

11. The display device according to claim 10, wherein a width of the initialization scan signal is set differently according to a driving frequency.

12. The display device according to claim 11, wherein the width of the initialization scan signal is set greater as the driving frequency is decreased.

13. A display device comprising:

an initialization power line to which a voltage of initialization power is supplied;

pixels including:

a light-emitting element including an anode electrode; and an initialization transistor connected between the anode electrode of the light-emitting element and the initialization power line, and turned on when an initialization scan signal is supplied to an initialization scan line connected to a gate electrode; and an initialization scan driver which supplies the initialization scan signal, wherein the initialization scan signal is provided in plural, initialization scan signals are sequentially supplied, and four initialization scan signals are successively supplied in which a first scan signal and second scan signal of the four initialization scan signals overlap one another, a third scan signal and fourth scan signal of the four initialization scan signals overlap one another, and the second scan signal and the third scan signal do not overlap one another.

14. A method of driving a display device supplying an initialization scan signal to supply a voltage of initialization power to an anode electrode of a light-emitting element, the method comprising:

supplying an i-th (i is a natural number) initialization scan signal to overlap an (i−1)-th initialization scan signal;

supplying an (i+1)-th initial scan signal so as not to overlap the i-th initial scan signal, and supplying an (i+2)-th initial scan signal to overlap the (i+1)-th initial scan signal.

15. The method according to claim 14, wherein an overlap period between the (i−1)-th initial scan signal and the i-th initial scan signal and an overlap period between the (i+1)-th initial scan signal and the (i+2)-th initial scan signal are set to be identical to each other.

16. The method according to claim 14, wherein a width of the initialization scan signal is set differently corresponding to a driving frequency.

17. The method according to claim 16, wherein the width of the initialization scan signal is set greater as the driving frequency is decreased.

18. A display device comprising:

a first initialization power line to which a voltage of first initialization power is supplied;

first pixels including:

a first light-emitting element; and a first initialization transistor connected between the first initialization power line and the first light-emitting element and turned on when an initialization scan signal is supplied;

a second initialization power line to which second initialization power is supplied;

second pixels including:

a second light-emitting element; and a second initialization transistor connected between the second initialization power line and the second light-emitting element and turned on when the initialization scan signal is supplied; and an initialization scan driver which sequentially supplies the initialization scan signals, wherein the initialization scan signals include four initialization scan signals that are successively supplied in which a first scan signal and second scan signal of the four initialization scan signals overlap one another, a third scan signal and fourth scan signal of the four initialization scan signals overlap one another, and the second scan signal and the third scan signal do not overlap one another.

19. The display device according to claim 18, wherein the first initialization power line and the second initialization power line are not electrically connected to each other.

20. The display device according to claim 18, wherein the first initialization power and the second initialization power are set to a same voltage value.

21. The display device according to claim 18, wherein the first pixels are disposed on an odd-numbered horizontal line, and the second pixels are disposed on an even-numbered horizontal line.

* * * * *